(12) United States Patent
Hormann et al.

(10) Patent No.: US 6,258,323 B1
(45) Date of Patent: Jul. 10, 2001

(54) APPARATUS AND METHOD USED IN MULTIPLE, SIMULTANEOUS SYNTHESIS OF GENERAL COMPOUNDS

(75) Inventors: Robert Eugene Hormann, Philadelphia; Daryl Eugene Gilbert, Fairless Hills; Edward Michael Sioma, Levittown, all of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/193,020

(22) Filed: Nov. 16, 1998

(51) Int. Cl.[7] .................. B01L 3/00; B01L 9/00; B01L 11/00; B32B 27/04
(52) U.S. Cl. .................. 422/99; 422/101; 422/102; 422/103; 422/104; 422/131; 422/132; 436/86
(58) Field of Search .................. 422/99–104, 131–132; 436/86

(56) References Cited

U.S. PATENT DOCUMENTS

| | | | |
|---|---|---|---|
| 4,599,314 | * | 7/1986 | Shami .................. 435/287 |
| 5,112,574 | * | 5/1992 | Horton .................. 422/102 |
| 5,252,296 | | 10/1993 | Zuckermann et al. . |
| 5,324,483 | | 6/1994 | Cody et al. . |
| 5,368,823 | | 11/1994 | McGraw et al. . |
| 5,503,805 | * | 4/1996 | Sugarman et al. .................. 422/131 |
| 5,529,756 | | 6/1996 | Brennan . |

(List continued on next page.)

FOREIGN PATENT DOCUMENTS

| | | |
|---|---|---|
| 196 02 464 | 7/1997 | (DE) . |
| 0 285 496 | 10/1988 | (EP) . |
| 2 630 927 | 11/1989 | (FR) . |
| 2 630 928 | 11/1989 | (FR) . |
| WO 92/02303 | 2/1992 | (WO) . |
| WO 98/56506 | 12/1998 | (WO) . |

OTHER PUBLICATIONS

Abstract—Automated Organic Chemical Synthesis at Organon, P. Hilberink, et al., Date Unknown but believed prior to Nov. 1996.

(List continued on next page.)

*Primary Examiner*—Arlen Soderquist
(74) *Attorney, Agent, or Firm*—Sudhir Deshmukh; Thomas D. Rogerson

(57) ABSTRACT

The apparatus and method of the present invention provides for conducting simultaneous multiple synthesis of general compounds, which often takes place under varied uneven conditions requiring heating, cooling, agitation, reagent/solvent additions to the reactor contents at each reaction vessel location, supply and maintenance of inert atmosphere and means to facilitate the reflux of the reactor contents. Thus, it becomes necessary to monitor and control the reaction conditions during the simultaneous multiple synthesis of general compounds. The apparatus allows the user to connect various independently controlling and conveying means to each reaction vessel through multiple ports provided on a stopper mounted on each reaction vessel. The apparatus of the present invention permits user to readily access the reaction vessels without interrupting the reactions occurring in the adjacent reaction vessels. The unique geometry and shape of the stopper allows positioning of multiple ports, while still providing the stopper with a compact size. As a result, a large array of reaction vessels can be accommodated in the device of the present invention without significantly increasing the overall size of the apparatus. Some of the general compounds that can be readily synthesized by the apparatus and the method of the present invention include inorganic compounds as well as organic compounds, such as oligomers, polymers, agricultural chemicals, drugs, peptides and oligonucleotides.

17 Claims, 13 Drawing Sheets

U.S. PATENT DOCUMENTS

| | | |
|---|---|---|
| 5,605,616 | 2/1997 | Zepp . |
| 5,609,826 * | 3/1997 | Cargill et al. .......................... 422/99 |
| 5,716,584 * | 2/1998 | Baker et al. ......................... 422/131 |
| 5,762,881 * | 6/1998 | Harness et al. ...................... 422/132 |

OTHER PUBLICATIONS

Advertisement—Automation Your Way Today, Bohdan Automation, Inc., Mundelein, IL Date Unknown but believed prior to Nov. 1996.

Advertisement—Nautilus 2400, Argonaut Technologies, Date Unknown but believed prior to Nov. 1996.

Advertisement, Diversomer 8–PIN Synthesizer, Chemglass, Inc., Date Unknown but believed prior to Nov. 1996.

* cited by examiner

APPARATUS AND METHOD USED IN MULTIPLE, SIMULTANEOUS SYNTHESIS OF GENERAL COMPOUNDS

FIELD OF THE INVENTION

This invention generally relates to an apparatus and a method used in multiple, simultaneous synthesis of general organic or inorganic compounds, oligomers or polymers, and it more particularly relates to multiple, simultaneous synthesis of agricultural chemicals, drugs, insecticides and other related materials.

BACKGROUND OF THE INVENTION

To produce "one" effective compound may require a bench chemist to react hundreds of compounds to form a library of compounds which is then extensively tested to discover that "one" most effective compound suited for a particular use, such as, for example an insecticide. One approach is to conduct such a general synthesis through the use of combinatorial chemistry. The technique of combinatorial chemistry permits one to simultaneously form large "libraries" of compounds en masse, in identifying the most promising "lead" compounds instead of synthesizing compounds one by one, as has been done traditionally. Such libraries of compounds are then screened to disclose the most effective compound for a particular use by high-throughput screening of these libraries. Thus, combinatorial organic synthesis (COS) is not random but systematic and repetitive use of sets of chemical "building blocks" for forming a diverse set of molecular entities. The combinatorial chemistry is a technologically advanced way of finding a proverbial "needle in a haystack". The approach is to remove the guesswork and instead, create and test as many compounds or mixtures as possible—logically and systematically—to obtain a viable set of active leads. Such combinatorial techniques have become very useful in producing small organic molecules with molecular weights of up to 1000, a molecular range in which drugs are generally found. Some of the common approaches to COS, include:

Systematic reaction of arrayed, spatially addressable building blocks in individual reaction wells or positions that form separated "discrete" molecules. Active compounds are identified by their location on the grid. Another technique, known as encoded mixture synthesis, uses nucleotide, peptide, or other types of more inert chemical tags to identify each compound. In yet another approach, a series of compound mixtures are synthesized combinatorially during deconvolution, each time fixing some specific structural feature. Each mixture is assayed as a mixture and the most active combination is then analyzed. Further rounds of synthesis systematically fix other structural features until a manageable number of discrete structures are synthesized and screened. Scientists working with peptides, for example, can use deconvolution to optimize or locate, the most active peptide sequence from millions of possibilities.

However, none of the devices or methods suitable for the multiple, simultaneous synthesis of peptides or oligonucleotides are useful in synthesizing general compounds. Among the many special problems found in the synthesis of general compounds, as opposed to peptide or oligonucleotide synthesis, is the problem of providing a device that accommodates the wide range of systematic manipulations required for synthesis of general compounds. The currently available devices, for example, have serious limitations in terms of:

lack of versatility, such as addition of solids in the midst of a reaction, difficulty in readily accessing the reactor contents without interrupting inert atmosphere, stirring, or heating/cooling of many of the neighboring reaction vessels;

lack of compactness, thereby requiring considerable laboratory space;

lack of scalability, since the conventional devices lack means such as, heating/cooling, mixing, or reagent addition; and lack of openness of architecture, which hampers the possibility of using adjunctive equipment, such as overhead stirring, spectroscopic probes, photochemical lamps, and sonicators.

Additionally, procedures adjunctive to the synthesis of general compounds, such as distillation, evaporation, and in certain cases, crystallization, would not be possible, or would be very difficult with the current devices. As a result, these current devices are restricted to parallel or combinatorial synthesis that takes place under uniform non-varying conditions.

Cody et al. (hereafter Cody) in U.S. Pat. No. 5,324,483 attempted to provide for an apparatus in which multiple, simultaneous synthesis of general compounds could be conducted. The apparatus of Cody consists of a reservoir block having a plurality of wells, a plurality of reaction tubes, having filters at their ends, holder block having a plurality of apertures; and a manifold which may have ports for introduction/maintenance of a controlled environment.

However, the simultaneous synthesis of general compounds often takes place under varied non-uniform conditions requiring ready access to various reaction vessels without interrupting the ongoing reactions occurring in adjacent reaction vessels. The prior art devices, including that of Cody, fail to allow the user such ready access. The apparatus and the method of the present invention solves the problem of access by providing means that permit such access.

Furthermore, the varied non-uniform reaction conditions generally required for the simultaneous synthesis of general compounds are typically monitored in real time with independent individual control of the reaction conditions at each reaction vessel location. The prior art devices, including that of Cody, are unsuitable for use under these special conditions required for general synthesis. The apparatus and the method of the present invention solves the problem of lack of real time monitoring and independent control of the reaction conditions at each reaction location by providing the user with means to conduct multiple, simultaneous synthesis of general compounds by simultaneously, independently and individually controlling the varied conditions in each reactor vessel location in real time.

STATEMENT OF THE INVENTION

The present invention is directed to an apparatus for multiple, simultaneous synthesis of compounds comprising:

a tank having located therein a plurality of reaction vessels supported by a reaction vessel mounting plate positioned inside said tank;

a plurality of lid blocks detachably mounted atop said tank whereby each said lid block selectively engages or disengages an adjacently located row of said reaction vessels; and a lid block lifter means for lowering or raising each said lid block to respectively sealably engage or disengage from said adjacently located row of said reaction vessels, such that said adjacently located row of said reaction vessels is exposed when said lid block lifter means are disengaged from said adjacently located row of said reaction vessels.

The present invention is further directed to a method for multiple, simultaneous synthesis of compounds comprising:

charging a plurality of reaction vessels positioned in a tank with one or more reactants;

sweeping each said reaction vessel with an inert gas therethrough to remove air therefrom;

conveying desired amounts of one or more reagents to each said reaction vessel;

heating said plurality of reaction vessels to a desired reaction temperature;

agitating the reactor contents in each said reaction vessel at a desired rate of agitation for a desired duration to produce reaction products in said plurality of said reaction vessels; and removing said reaction products from said plurality of said reaction vessels.

One of the advantages of the apparatus the present invention is that individual reaction vessels are readily accessed by the user, without interrupting the reactions occurring in proximately positioned reaction vessels of the apparatus.

Another advantage of the present invention is that it allows the user to connect various controlling and conveying means to each reaction vessels through multiple ports provided on a stopper mounted on each reaction vessel. The unique geometry and shape of the stopper allows the positioning of multiple ports, while still keeping the overall size of the stopper substantially the same as that of the opening on the reaction vessel. As a result, a large array of reaction vessels can be accommodated in a compact space.

Another advantage of the apparatus of the present invention is that it is constructed from materials that are chemically inert or resistant to the reactants and solvents used during the reactions.

Yet another advantage of the apparatus of the present invention is that it permits user to independently control the rate of agitation in each reaction vessel.

Still another advantage of the present invention are the safety means provided on each reaction vessel for maintaining safe working conditions, such as safe working pressure.

Another advantage of the apparatus of the present invention is that it is suitable for simultaneously synthesizing a library of general compounds. Some of such general compounds include inorganic compounds, or organic compounds, such as oligomers or polymers and more particularly agricultural chemicals, drugs, insecticides and other related materials as well as peptides or oligonucleotides.

BRIEF DESCRIPTION OF THE DRAWINGS

FIG. 1 illustrates one of the detachably mounted lid block of the apparatus in a raised open position over a tank of the apparatus, thereby exposing a row of reaction vessels positioned in the tank underneath.

FIG. 2 illustrates the lid blocks in a closed position before the lid blocks and reaction vessels in the tank are sealably engaged.

FIG. 3 illustrates the lid blocks and the reaction vessels in a closed sealed position.

FIG. 5 illustrates the details of lid block lifter means and means for condensing volatile effluents.

FIG. 10 illustrates the use of a modified apparatus of the present invention that stores and dispenses a plurality of solvents and/or reagents to the reaction vessels.

DESCRIPTION OF THE PREFERRED EMBODIMENTS

Figure 1:
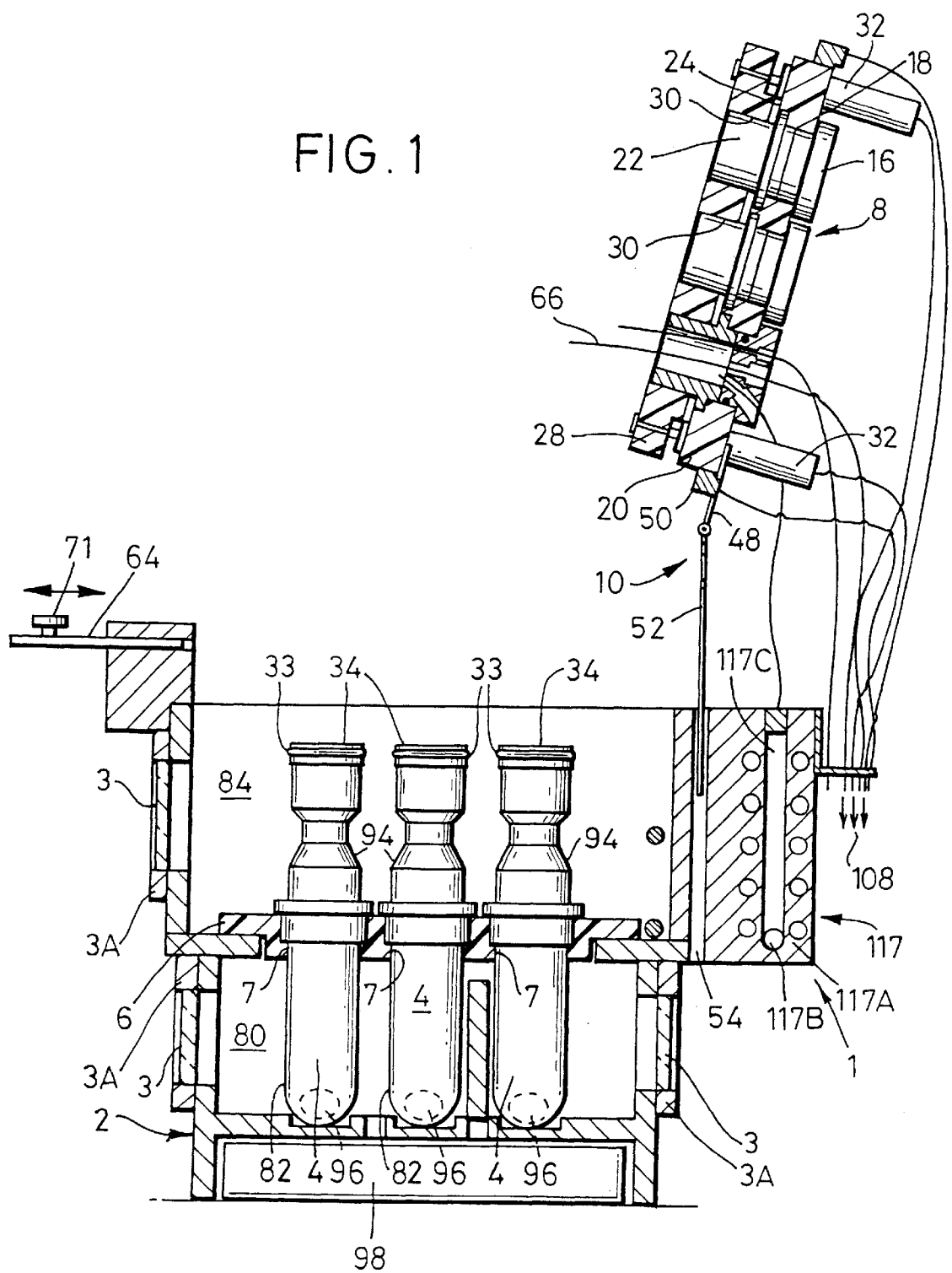
FIGS. 1, 2, 3 are partial cross sectional elevations of an apparatus of present the invention taken along the section line AA of a partial three-dimensional view of the apparatus in the direction BB.

The major components of an apparatus of the present invention, referred by numeral 1, are shown in FIGS. 1, 2, 3 and 4. Apparatus 1 includes a tank 2 having positioned therein a plurality of reaction vessels 4. Reaction vessels 4 are supported by a reaction vessel mounting plate 6 positioned inside tank 2.

A plurality of lid blocks 8 are detachably mounted atop tank 2, whereby each lid block 8 selectively engages or disengages an adjacently located row of reaction vessels 4.

Lid block lifter means 10 are slidably mounted on tank 2 to lower or raise each lid block 8 to respectively engage or disengage an adjacently located row of reaction vessels 4. The adjacently located row of reaction vessels 4 is exposed when lid block lifter means 10 are disengaged from such a row of reaction vessels 4 to allow the user to easily access vessels 4 underneath lid block 8.

Apparatus 1 further includes means 12 for independently controlling the reaction conditions in real time in each of reaction vessels 4 and means 14 for independently conveying one or more ingredients to each of reaction vessels 4.

Figure 9A:
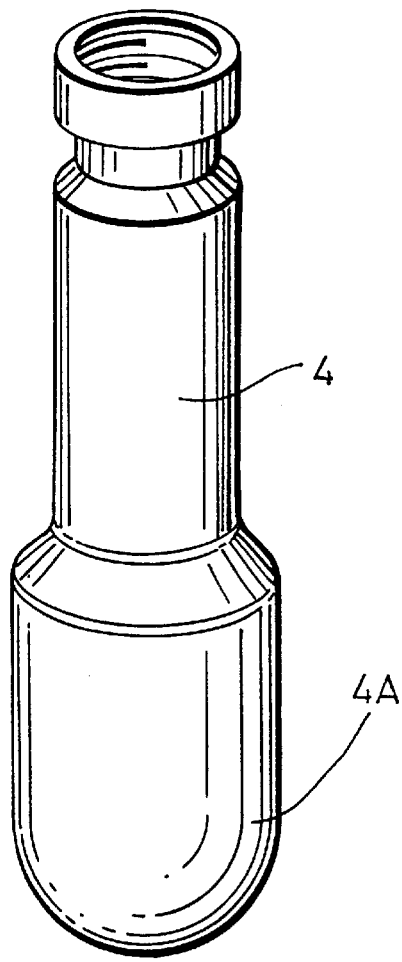
FIGS. 9A, 9B, 9C, 9D and 9E are cross sectional views the various embodiments of the reaction vessels.
Figure 9B:
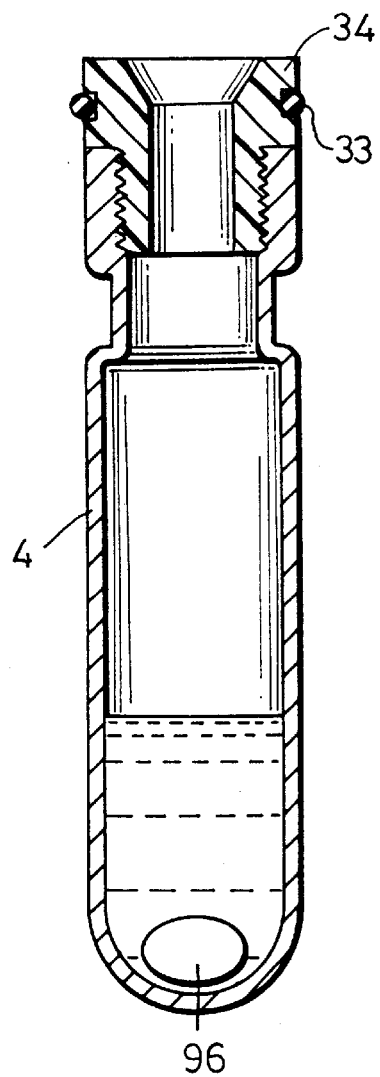
Figure 9C:
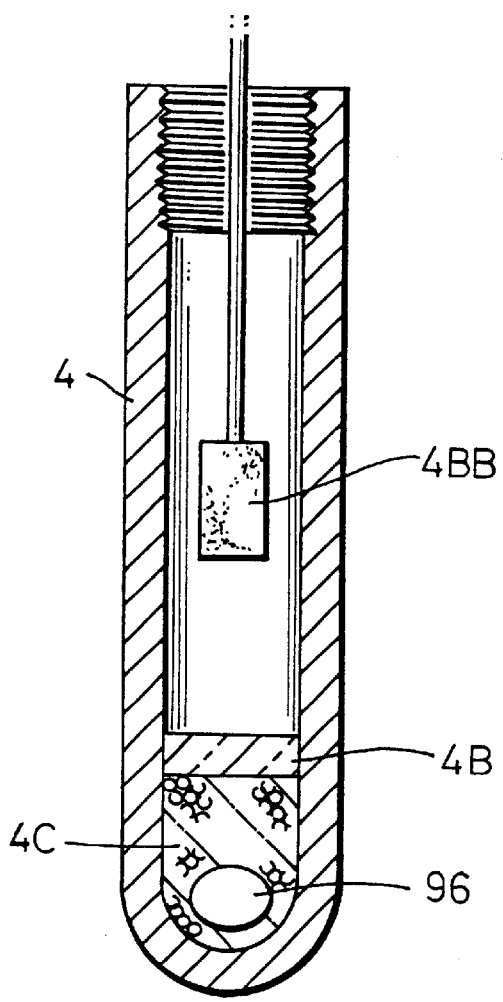
Figure 9D:
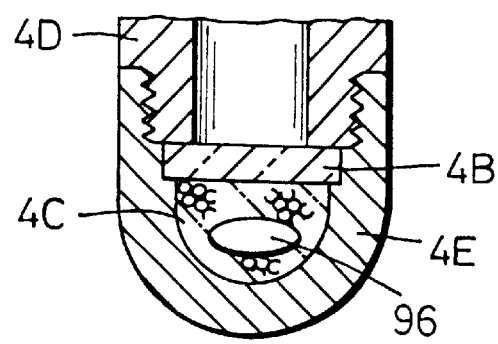
Figure 9E:
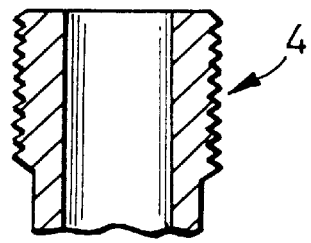

Describing in further details, as seen in FIGS. 9A, 9B, 9C and 9E, reaction vessel 4 is a vessel capable of containing the reactor contents, such as reagents, solvents, resin substrates and other components used during a typical chemical reaction. Preferably, reaction vessel 4 has elongated shape that is open at one end and closed at the other end. Reaction vessel 4 may be provided with round or flat shape or even an enlarged shape 4A, such as that shown in FIG. 9A. The material from which reaction vessel 4 is made, is impervious to chemical attack from the reactor contents. Preferably, reaction vessel 4 is a vessel made of transparent glass that allows user to observe the reactor contents contained in vessel 4. Reaction vessel 4 is generally provided with an internal volume in the range of from 1 ml to 5000 ml, preferably in the range of from 20 ml to 50 ml, and a length varying in the range of from 20 mms to 500 mm, preferably in the range of from 100 mms to 200 mms. The inner diameter of reaction vessel preferably varies in the range of from 7 mms to 200 mms, preferably in the range of from 25 mms to 50 mms. The open end of reaction vessel 4 is preferably threaded to allow screw mounting of a vessel mount 34, which is described in details below. Preferably reaction vessels 4 are provided with standardized threads. FIGS. 9A, 9B and 9C illustrate reaction vessels 4 with internal threads whereas the partial view in FIG. 9E illustrates a reaction vessel 4 provided with external threads. It should be noted that it would occur to one of ordinary skill in the art to utilize alternate ways of mounting and demounting vessel mount 34 on reaction vessel 4. One such means would be to use a friction-fitted vessel mount.

In one of the alternative embodiments shown in FIG. 9C, reaction vessel 4 may be provided with a conventional screen 4B that preferably retains a solid substrate 4C, such as polymer beads having activated surfaces typically utilized in sequential coupling reactions generally used in preparing compounds such as, oligonucleotides and peptides. Screen 4B is provided with sufficient porosity to permit free flow of solvents and reagents while retaining solid substrate 4C. Screen 4B may be made of inert porous materials, such as polymeric materials and glass. Screen 4B made of sintered glass is preferred. Alternatively, as shown in FIG. 9D, screen 4C may be retained on a shoulder in a split reaction vessel having an upper section 4D and a lower section 4E, which are preferably provided with threaded sections to sealably engage upper section 4D with lower section 4E. Another alternative screen is shown in FIG. 9C wherein a screen 4BB, preferably of sintered glass, may be affixed to an opening of an outlet tube.

Reaction vessel mounting plate 6 is positioned substantially in the middle of tank 2. Reaction vessel mounting plate 6 is preferably a substantially planar plate made of insulating materials, such as high density polyethylene or polycarbonate, such as Lexan® polycarbonate supplied by General Electric Company, Pittsfield, Mass. Plate 6 is provided with an array of holes 7, which typically match with the number of reaction vessels 4 positioned on reaction vessel mounting plate 6. Each reaction vessel 4 is anchored in place by passing it through hole 7 on reaction vessel mounting plate 6 and then resting it on the floor of tank 2. It is contemplated that one may, if desired, remove reaction vessel mounting plate 6 out of tank 2 with a bank of reaction vessels 4 mounted thereon.

For the sake of illustration only, the accompanying drawings and description describe apparatus 1 with reaction vessel mounting plate 6 containing an array of 3×3 of reaction vessels 4 of substantially identical shape and volume. An array of 3×3, as used herein, means three rows with each such row having three reaction vessels 4. Reaction vessel mounting plate 6 containing more or less, including just one of such reaction vessels 4 or reaction vessel mounting plate 6 containing reaction vessels 4 of different volumetric sizes or shapes is entirely within the scope of this invention. Furthermore, tank 2 is described in the accompanying drawings as having a substantially rectangular shape. A tank having other shapes, such as a square or circular shape, is also entirely within the scope of the present invention. Moreover, if desired, one may opt to use less number of reaction vessels 4 than provided for in apparatus 1.

Tank 2 is preferably provided with one or more observation windows 3 to allow visual observation and inspection of reactor contents in reaction vessels 4. Windows 3 are visually made of a transparent material that is capable of withstanding chemical attack that could occur from fluids inside tank 2 as well as strong enough to withstand fluid pressure that may exist inside tank 2. Some of the suitable materials include, sheets of tempered glass or polycarbonate, such as Lexan® polycarbonate supplied by General Electric Company, Pittsfield, Mass. Windows 3 comprising the aforedescribed transparent sheets are sealably attached to the walls of tank 2 by conventional retaining means, such as a retaining bezel 3A.

Figure 4:
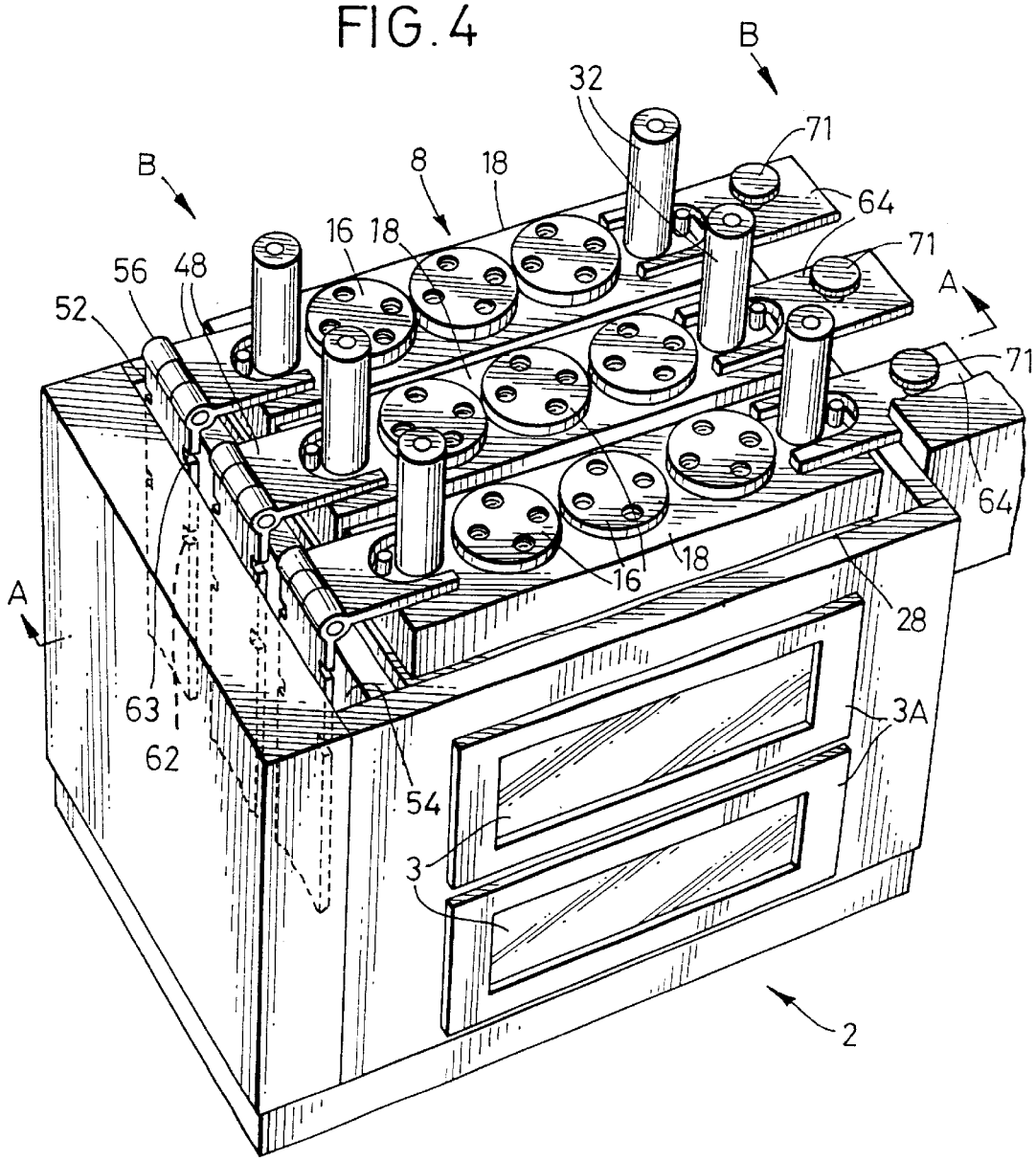
FIG. 4 is a partial three-dimensional view of the apparatus of the present invention illustrating an array of 3×3 reaction vessels.

The total number of lid blocks 8 utilized in apparatus 1 depends upon the number of rows of reaction vessels 4 positioned on reaction vessel mounting plate 6. Thus, by way of example and as shown in FIG. 4, the array of 3×3 reaction vessels 4 would require three lid blocks 8 to selectively engage or disengage the adjacently located row of reaction vessels 4. The term "selectively engage or disengage" as used herein, means that user can engage or disengage each lid block 8 with the row of the adjacently located reaction vessels 4 without affecting the engagement or disengagement of other adjacent lid blocks 8 and without interrupting the reactions occurring in adjacent reaction vessels 4.

As shown in FIGS. 1 through 5, each lid block 8 includes a plurality of stoppers 16 positioned on an upper face 18 of a stopper plate 20 and a plurality of lid mounts 22 positioned on a bottom face 24 of stopper plate 20. Each lid mount 22 is in a sealable contact with stopper 16 positioned adjacent to that lid mount. A connector plate 28 is slidably mounted on and aligned with stopper plate 20 by conventional means, such as mounting rods. Connector plate 28 is provided with a plurality of lid mount openings 30 that allow lid mounts 22 to slidably pass therethrough. Each lid mount 22 is aligned to maintain a sealable contact with each stopper 16 adjacent thereto and a vessel mount 34 mounted on reaction vessel 4 in contact therewith. The number of stoppers 16 and lid mounts 22 on each lid block 8 correspond to and depend upon the number of reaction vessels 4 provided in the row with which lid block 8 engages. By way of example, a row containing three reaction vessels 4 would engage with lid block 8 having three stoppers 16 and three lid mounts 22.

Figure 2:
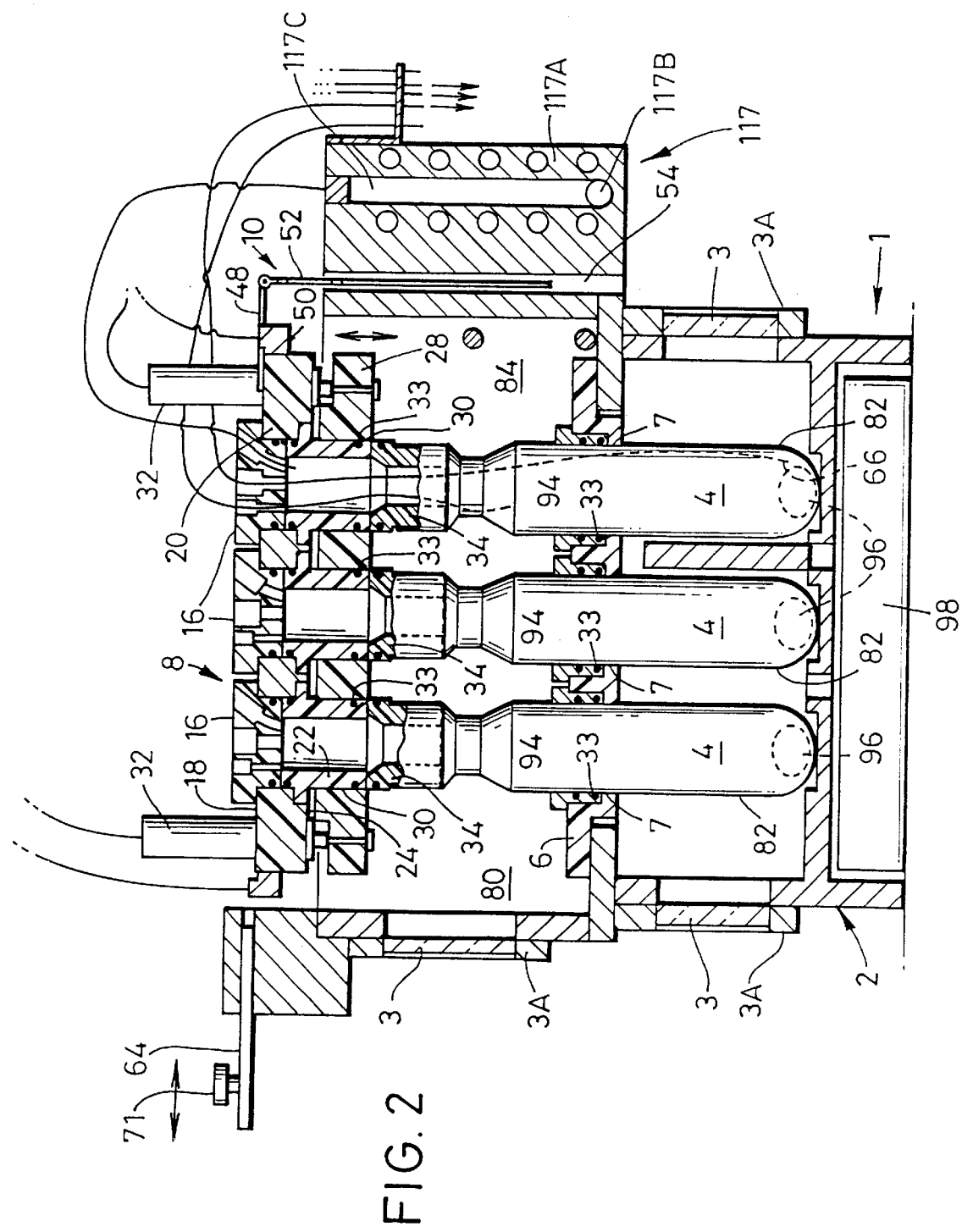
Figure 3:
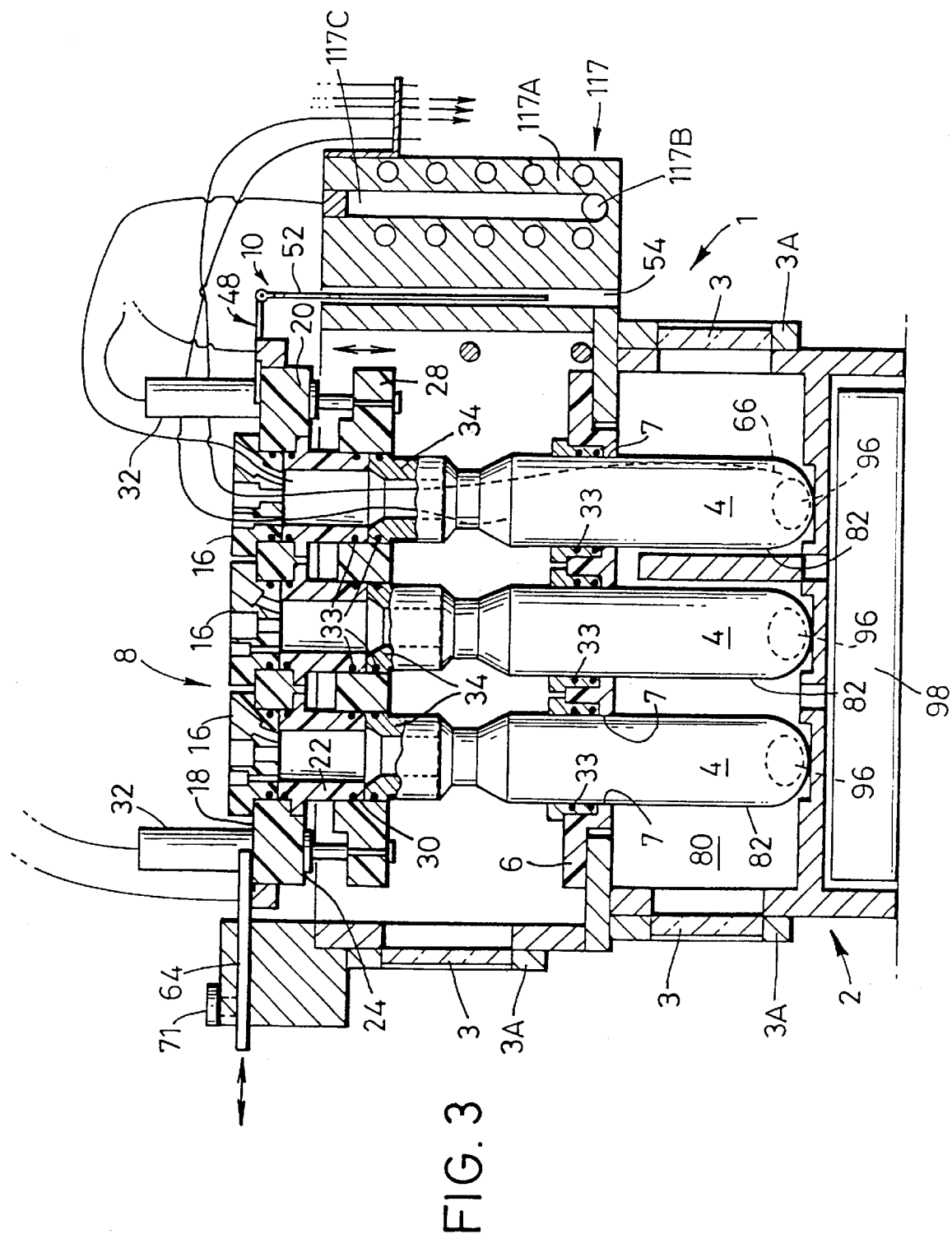

Lid block 8 is further provided with means 32 for reciprocating connector plate 28 positioned on stopper plate 20 for sealably engaging or disengaging vessel mount 34 demountably mounted on reaction vessel 4 with each lid mount 22 positioned in corresponding relationship with vessel mount 34 on each reaction vessel 4. Means 32 for reciprocating connector plate 28 conventional and are preferably two conventional pneumatic cylinders positioned at either ends of stopper plate 20 for actuating connector plate 28 back and forth to respectively disengage or engage vessel mount 34. Thus, upon a signal, compressed air is supplied at either end of conventional pneumatic cylinder to actuate connector plate 28. FIG. 2 illustrates connector plate 28 in a disengaged position from vessel mounts 34 and FIG. 3 illustrates connector plate 28 in an engaged position with vessel mounts 34.

Sealing means 33 are provided on vessel mount 34, lid mount opening 30 and stopper 16 to seal the contents in reaction vessel 4. Preferably, sealing means 33 include compressible "O" rings, typically made of chemically inert resinous material, such as silicone rubber. O-rings made of silicone rubber coated with polyfluorinated ethylene propylene supplied by Sealing Specialties, Inc., Souderton, Pa. are preferred.

Stopper plate 20, connector plate 28, stopper 16, lid mount 22 and vessel mount 34 are made from chemically inert material, such as high density polyethylene or Teflon® polytetrafluoroethylene, supplied by DuPont Company, Wilmington, Del. Conventional retaining means, such as screws or threaded couplings, are provided to retain stopper 16 and lid mount 22 on stopper plate 20.

As shown in FIGS. 6, 7, 7A and 7B, a head 15 of stopper 16 is provided with a plurality of ports used for controlling reaction conditions inside reaction vessel 4 as well as for supplying reagents, solvents, inert gas, and for removing reactor contents. Head 15 is preferably provided with a first port 36, a second port 38, a third port 40, a fourth port 42, a fifth port 44 and a sixth port 46. As seen in FIGS. 6, 7, 7A and 7B, the applicants have unexpectedly discovered a novel geometric shape that allows positioning of these various ports on head 15 of stopper 16 without appreciably increasing the overall size of stopper 16. Head 15 is provided with port entry passages inside stopper 16 at various angles, which are then connected to substantially straight exit passages resulting in stopper 16 of compact size having multiple ports. Head 15 of stopper 16 is preferably shaped with various substantially flat faces on which various ports are positioned. The size of flat face depends upon the size of coupling used to connect various means to reaction vessel 4. Thus, larger the size of the port coupling, larger will be the face on which the port is positioned. Threaded couplings, such as polymer resin couplings, are preferred. For example, first port 36 and second port 38 are preferably used for supplying reagents and solvents to and removing reactor contents from reaction vessel 4. Furthermore, by angling or chamfering the substantially flat surface, such as 42A, on which coupling is threaded on or affixed thereto, the overall size of stopper 16 can be substantially reduced. By positioning ports on flat angled surfaces, connector couplings which are typically threaded, can be bottomed out on such flat surfaces to provide effective seal. Thus, head 15 of stopper 16 provided with an angled face 36A having first port 36 thereon, similarly angled face 38A at the opposite end for second port 38 and a flat face 40A interposed between faces 36A and 38A used for another port 40, not only permits sealable mounting of couplings thereon but such a geometry also results in stopper 16 having compact overall size.

Port 40 is preferably connected to components, such as a safety valve or a lance for removing reactor contents from reaction vessel 4. Alternatively, port 40 may be used for positioning a stirring device (not shown). Port 40 is preferably centrally positioned when a stirring device with external motor drive, such as that supplied by Elliot Manufacturing Co., Binghamton, N.Y. is used.

Ports 42, 44 and 46, preferably smaller than ports 36, 38, and 40, are positioned on angled faces 42A, 44A and 46A respectively to connect various components, such as means for monitoring reaction conditions inside reaction vessel 4. Faces 42A, 44A and 46A are preferably positioned on head 15 of stopper 16 at a location that is diametrically opposite to the location of port 40, thereby providing sufficient space for angled entry passages of ports 42, 44 and 46, which are connected to substantially vertical exit passages provided inside stopper 16. The foregoing geometry is preferably produced by injection molding stopper 16 with the required shape and various internal passages. Stopper 16 may be provided with threads for thread mounting on stopper plate 20. However, one may elect to retain stopper 16 on stopper plate 20 with a bezel ring (not shown). Furthermore, it is contemplated that stopper 16 may be provided with fewer or more ports than those described above. The user also has an option to not utilize some of the ports, if not required, during use, or use them for different purposes other than those described above. Stopper 16 is also suitable for use in other chemical reactors or devices besides apparatus 1 described herein. The present invention further contemplates having stopper 16 as an integral part of stopper plate 20 instead of being a separate component as described herein.

Figure 5:
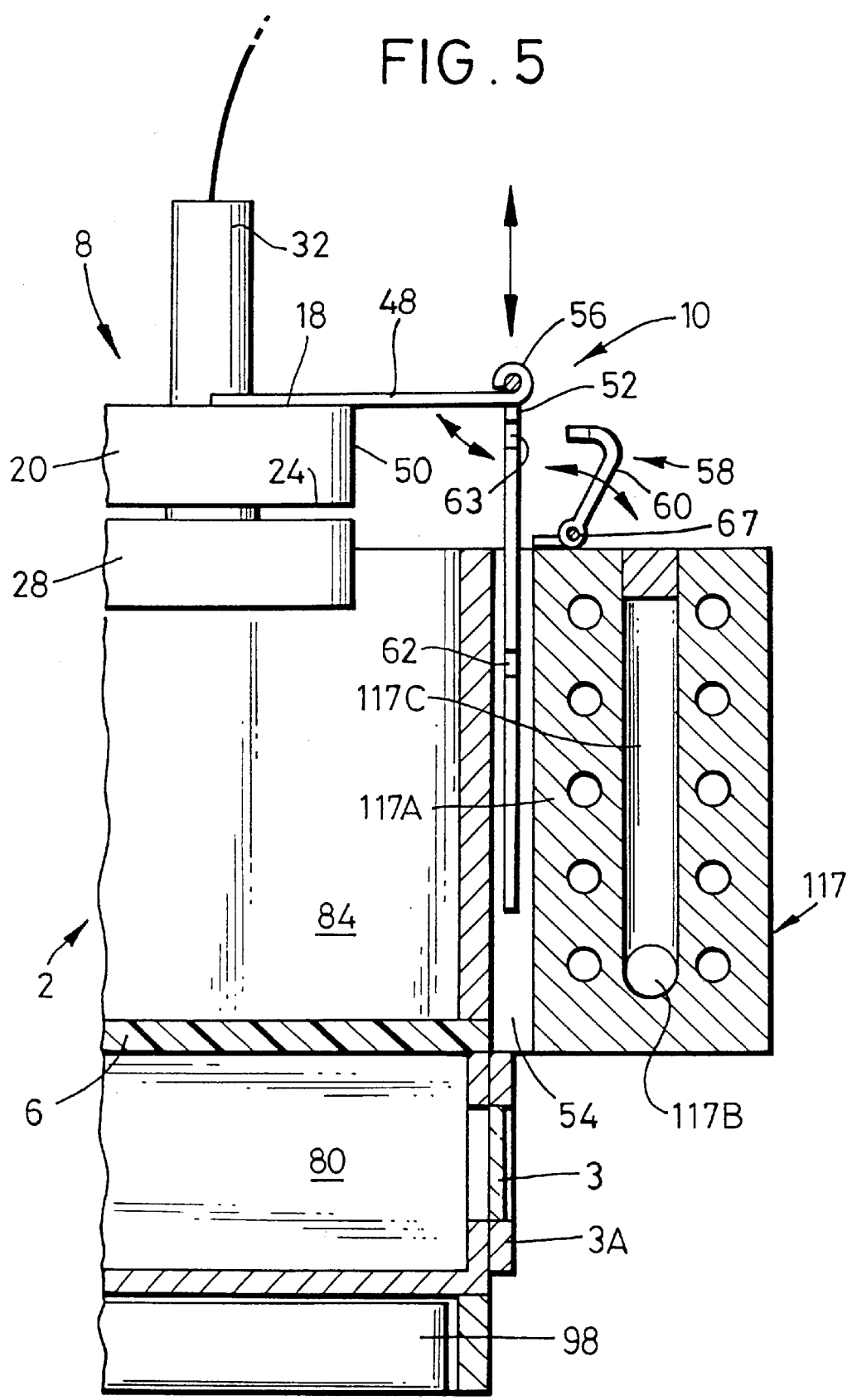
FIG. 5 is partial cross sectional view taken along the section line AA of the partial three dimensional view of the apparatus in the direction BB.
Figure 6:
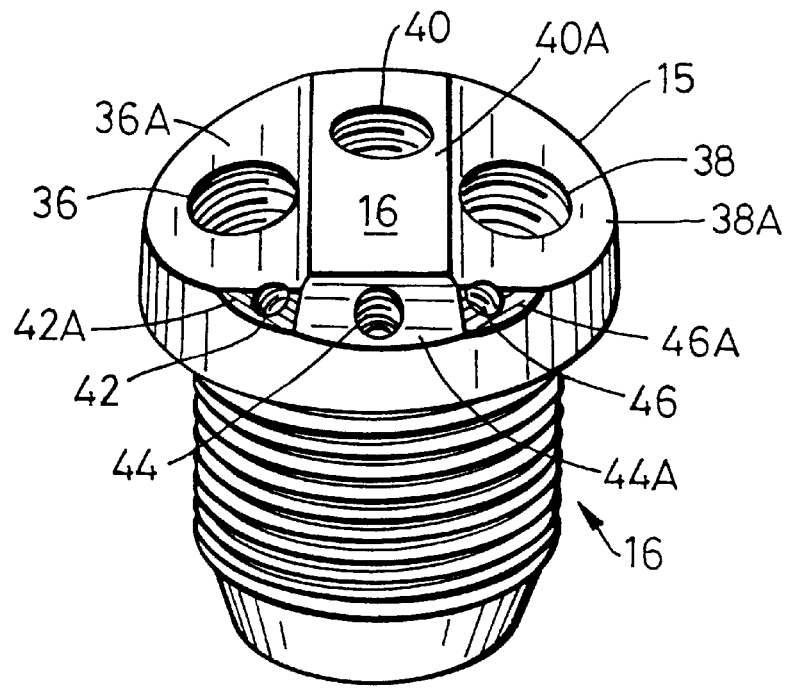
FIG. 6 is a three dimensional view of a stopper having multiple ports.
Figure 7:
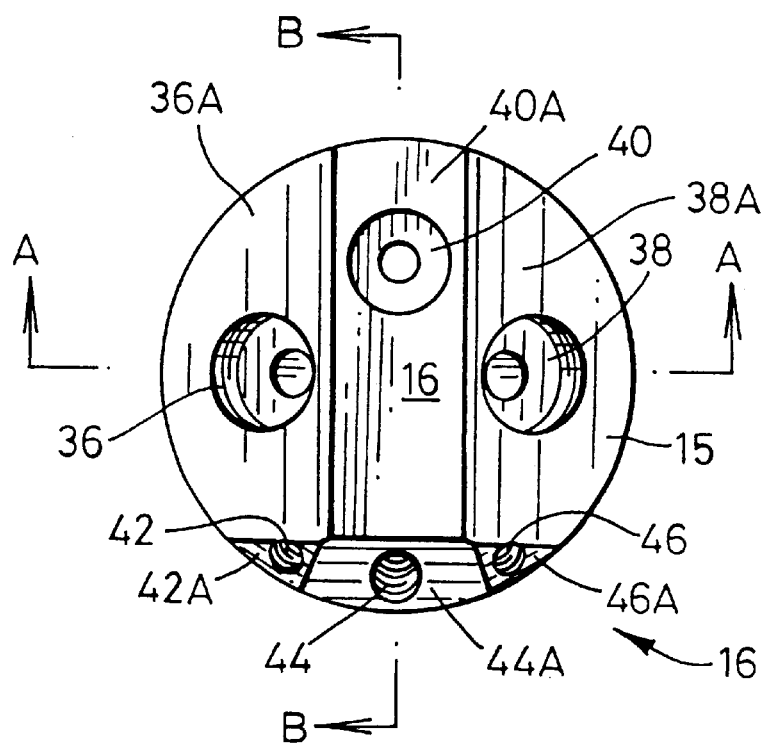
FIG. 7 is a plan view of the stopper of FIG. 6.
Figure 7A:
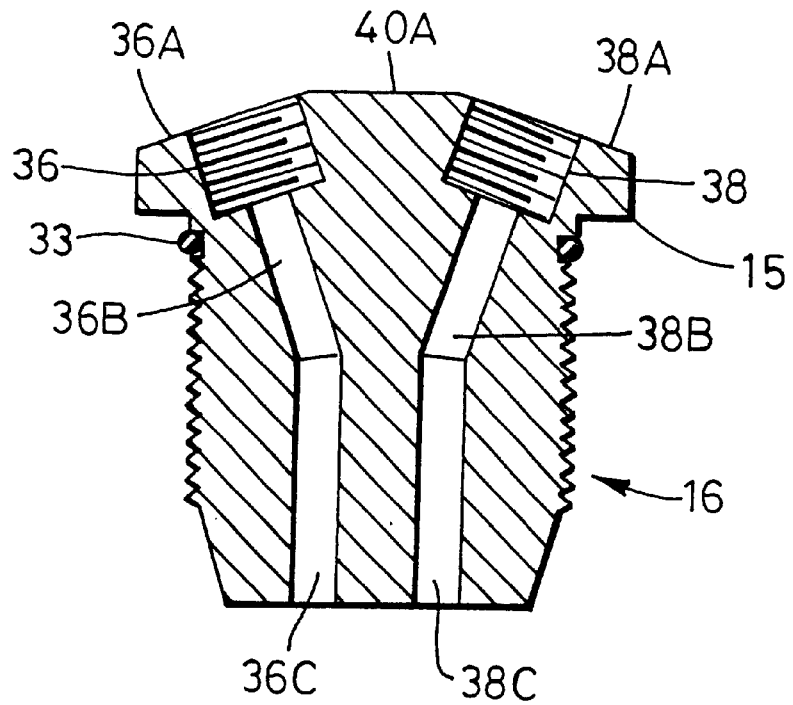
FIG. 7A is a cross sectional view of the stopper taken along sectional line AA of FIG. 7.
Figure 7B:
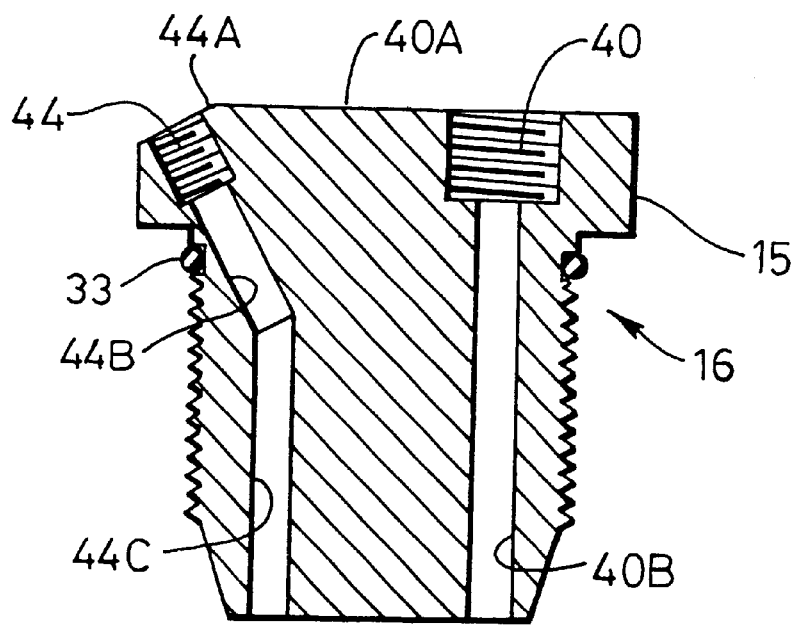
FIG. 7B is a cross sectional view of the stopper taken along sectional line BB of FIG. 7.

As shown in more details in FIG. 5, each lid block lifter means 10 include a first arm 48 connected to an arm end 50 of stopper plate 20 of lid block 8 and a second arm 52 slidably positioned in a slot 54 on tank 2 to selectively raise or lower lid block 8. Swivel means 56 located between first arm 48 and second arm 52 permit user to swing lid block 8 away from the row of reaction vessels 4 in a raised position to substantially expose the row of reaction vessels 4 located underneath lid block 8 As a result, the user can readily access the row of exposed reaction vessels 4 underneath. FIG. 1 shows lid block 8 in a raised position and FIGS. 2, 3 and 4 show lid blocks 8 in a lowered position.

As shown in FIG. 5, locking means 58 are provided for securing lid block 8 in a raised open position to thereby allow the user ready access to reaction vessels 4 positioned below lid block 8 or for securing lid block 8 in a lowered locked position. Locking means 58 include a lock bracket 60 affixed to tank 2. A first detent 62 is provided on second arm 52 of lid block lifter means 10 to engage lock bracket 60 so that lid block 8 can be held and locked in a raised open position. A second detent 63 is provided on second arm 52 of lid block lifter means 10 to engage lock bracket 60 so that lid block 8 can be held and locked in a lowered locked position to sealably engage the row of reaction vessels 4 underneath. Lock bracket 60 is preferably provided with a hinge 67 such that lock bracket 60 can readily engage or disengage first detent 62 and second detent 63.

To sealably engage lid block 8 with the adjacent row of reaction vessels 4, as shown in FIGS. 2 and 3, one end of lid block 8 is locked by means of a locker arm 64 positioned on tank 2 and the other end is locked by swinging in lock bracket 60 to engage second detent 63 on second arm 52. As shown in FIG. 3, locker arm 64 is slid in its chase to lock-in lid block 8 by pushing on a knob 71 affixed to locker arm 64, As shown in FIG. 2, locker arm 64 is slid out to disengage lid block 8 before lid block 8 can be raised. It should be understood that one of ordinary skill in the art would contemplate using alternative locking means, such as clamps or clips, to lock-in lid block 8, or automated locking means, such pneumatically operated or solenoid driven bolts that can be pushed into a locking detent or hole provided on lid block 8.

First arm 48, second arm 52, lock bracket 60 and locker arm 64 are preferably substantially planar rigid members made from chemically inert material such as, stainless steel.

Figure 8:
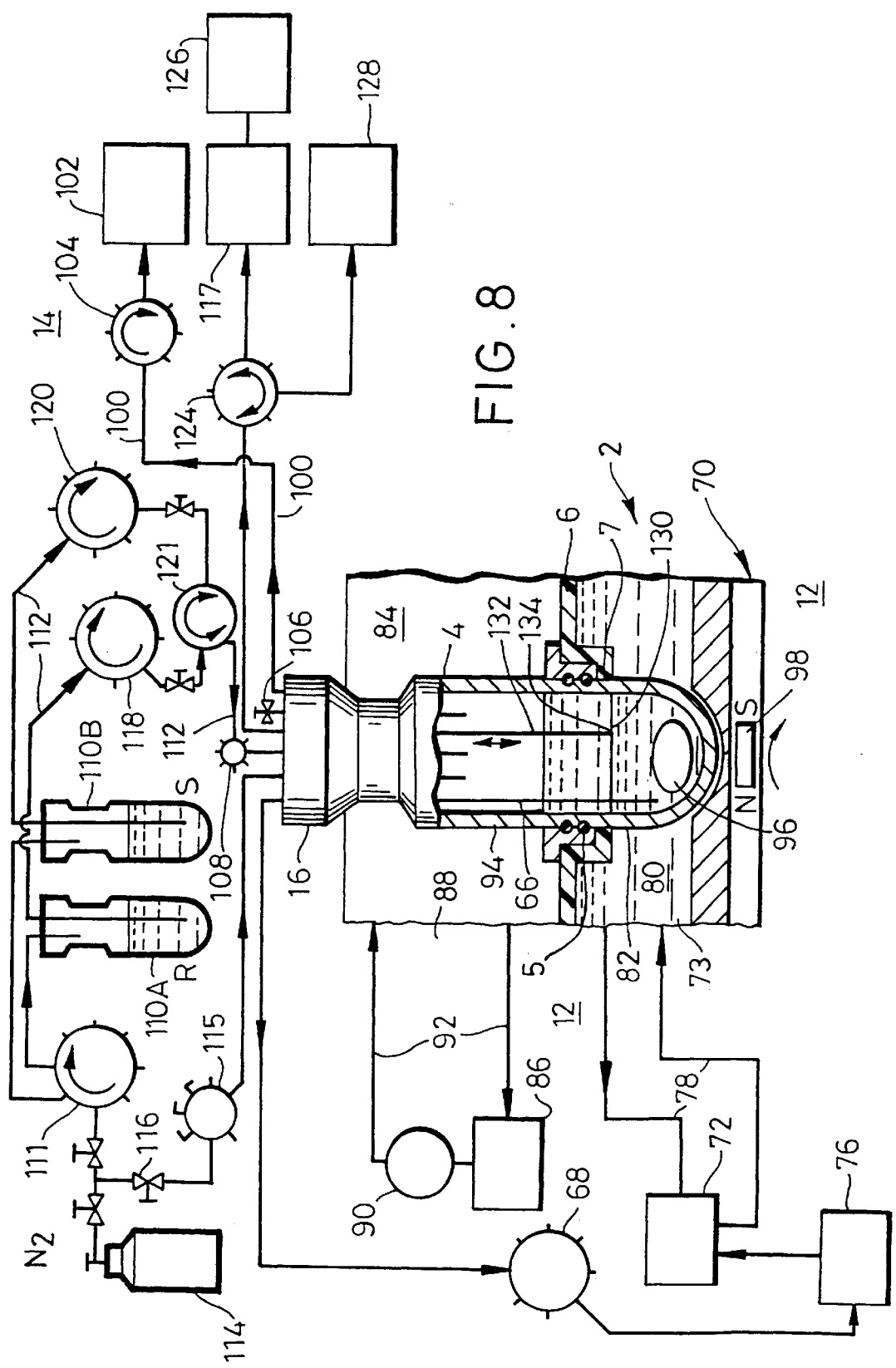
FIG. 8 is a schematic diagram of the apparatus illustrating means for independently controlling the reaction conditions in real time in each of the reaction vessels and means for independently conveying one or more ingredients to each of the reaction vessels.

As shown in FIG. 8, means 12 of apparatus 1 for independently controlling the reaction conditions in real time, i.e., as the reaction is occurring, in each of reaction vessel 4 allow the user to independently and individually control and monitor reaction conditions in each of reaction vessel 4. Means 12 include means 66 for sensing reaction temperature, preferably a thermocouple, placed inside each reaction vessel 4 with the leads from the thermocouple, passing via one of the ports, such as fifth port 44 of each stopper 16. The leads from means 66 are connected to centralized means 68 for controlling the reaction temperature of the contents in the plurality of reaction vessels 4. One such suitable means include Digi-Sense® 12-channel scanning thermometer (with RS-232 output) supplied by Cole-Parmer Instrument Company, Oak Park, Ill.

Means 12 further include means 72 for heating or cooling a heat transfer medium 73 to an effective temperature, means 76 for maintaining heat transfer medium 73 at the effective temperature based on the feed back from means 66 and the effective temperature setting set by the user, and means 78 for supplying heat transfer medium 73 at the effective temperature to a portion 80 of tank 2 below reaction vessel mounting plate 6 for heating or cooling lower portions 82 of the plurality of said reaction vessels 4.

Means 72, are conventional, such as for example, constant temperature bath/circulators & recirculating chillers (provided with microprocessor and RS-232 port) all supplied by NESLAB Instruments, Inc., Portsmouth, N.H.

Means 76 are conventional, such as for example, a PC based processor which receives feedback from RS-232 port on means 68. Feedback signal is brought into a conventional program, such as that written in Visual Basic, C, or optionally using instrument interface software, such as Winwedge® serial interface software supplied by TAL Technologies, 2027 Wallace Street, Philadelphia, Pa. 19130. This program is used for converting an analog signal obtained from a thermocouple into a digital output, which is then used to control the effective temperature of the circulating bath (this temperature is programmed from the PC) by adjusting the heating and cooling rates.

Means 78 are conventional, such as for example, stainless steel, copper, polyfluorinated ethylene propylene or perfluoroalkoxy polymer tubing supplied by McMaster-Carr Supply Company, New Brunswick, N.J.

If desired, portion 80 of tank 2 may be subdivided into compartments whereby each row of reaction vessels 4 is separated from the adjacent row by an insulated vertical partition to heat or cool lower portions 82 of reaction vessels 4 in each row with different heating or cooling temperatures, thereby providing even greater control over the reactor contents in reaction vessels 4.

Heat transfer medium 73 would typically include conventional media, such as water, silicone oil, and liquid paraffin. Silicone oil, such as Syltherm™ XLT silicone heating oil supplied by Dow Chemical Company, Midland, Mich., is preferred. The selection of heat transfer medium 73 depends upon the range of temperatures necessary to heat or cool lower portions 82 of reaction vessels 4 to desired reaction temperatures, which typically ranges from −70° C. to 200° C., preferably from −20° C. to 140° C.

As shown in FIG. 8, vessel sealing means 5, positioned in hole 7 and vessel mounting plate sealing means (not shown), such as a gasket, are preferably provided to sealably divide the inner space of tank 2 into portion 80 and a portion 84 above reaction vessel mounting plate 6. Vessel sealing means 5 preferably include a compressible O-ring, typically made of chemically inert resinous material, such as silicone rubber. O-rings made of silicone rubber coated with polyfluorinated ethylene propylene supplied by Sealing Specialties, Inc., Souderton, Pa. are preferred If desired, means 12 for independently controlling the reaction conditions in real time further include means 86 for cooling a cooling medium 88 to an effective cooling temperature, means 90 for maintaining cooling medium 88 at the effective cooling temperature set by the user and means 92 for supplying cooling medium 88 at the effective cooling temperature to portion 84 of tank 2 for cooling upper portions 94 of the plurality of reaction vessels 4.

Means 86 are conventional, such as for example, refrigerated bath/circulator with microprocessor and RS-232 port supplied by NESLAB Instruments, Inc., Portsmouth, N.H. Means 90 are conventional, such as, for example, remote temperature sensor with RS-232 computer port supplied by NESLAB Instruments, Inc., Portsmouth, N.H. Means 92 are conventional, such as for example, stainless steel, copper, polyfluorinated ethylene propylene or perfluoroalkoxy polymer tubing supplied by McMaster-Carr Supply Company, New Brunswick, N.J.

Cooling medium 88 typically includes conventional coolants, such as water; refrigerants that are capable of cooling upper portions 94 of reaction vessels 4 to temperatures down to −20° C., preferably down to 5° C.; or mixtures of water and the refrigerant. Some of the suitable refrigerants include ethylene glycol and silicone oil. Water is preferred.

It is contemplated that tank 2 may be further subdivided by providing one or more additional reaction vessel mounting plates 6 to create additional heating or cooling zones, so that different portions of reaction vessels 4 would be exposed to different heating or cooling temperatures.

Means 12 further include means 70 for agitating the reactor contents in each of reaction vessels 4. Means 70 permit user to independently and individually start, stop or control the rate of agitation in each reaction vessel 4. Means 70 include an agitator 96 located in each of reaction vessel 4 and means 98, such as, for example, magnetic stirring plates supplied by Variomag®-USA., South Daytona, Fla. for selectively propelling agitator 96 positioned in each of reaction vessel 4 to stop, start and control the rate of agitation in each reaction vessel 4.

Agitator 96 is preferably a polytetrafluroethylene coated magnetic stirrer, such as that supplied by Variomag®-U.S.A., South Daytona, Fla. One would recognize that the size and shape of agitator 96 is predicated upon the type of reactions desired in reaction vessel 4 and the size of reaction vessel 4. Means 98 for selectively propelling agitator 96 positioned in each of reaction vessel 4 typically include induction coils that produce motion due to magnetic force on agitator 96. Mean 98 are preferably positioned underneath tank 2. It should be noted that the stirring devices (not shown) in means 98 depend upon the number reaction vessels 4 positioned in tank 2. Thus, by way of example, an array of 3×3 reaction vessels 4 will also have an array of 3×3 stirring devices to independently and individually propel, preferably to rotate, agitator 96 at desired RPMs in each of reaction vessels 4. Means 98 for selectively propelling agitator 96 positioned in each of reaction vessel 4 can be set to start and then stop after a preset time period, intermittently rotate agitator 96 in a preset pattern or other adjustable patterns for achieving the desired chemical reactions in individual reaction vessels 4.

If desired, means 12 for independently controlling the reaction conditions in real time in each reaction vessel 4 may also include means 100 for conveying an aliquot of the reactor contents from reaction vessel 4 to a conventional chemical characterization device 102, such as a liquid or gas chromatograph connected to a conventional mass spectrometer. Suitable liquid or gas chromatograph includes that supplied by Hewlett Packard®, Chemical Analysis Group, Wilmington, Del. Means 100 are connected via one of the ports such as, port 46 on stopper 16 of each reaction vessel 4. Thus, the user can control the starting, stopping or the rate of the ongoing reactions, or additions of various reagents or solvents necessary to attain the desired reaction outcome by withdrawing the reaction product aliquot from reaction vessel 4 and characterizing the withdrawn reaction product by characterization device 102. Preferably, means 12 include a conventional sequencer 104, such as that supplied by Valco Instruments Company of Houston, Tex., to sequentially convey aliquots from various reaction vessels 4 to a single chemical characterization device 102. Alternatively, several chemical characterization devices could be also employed to simultaneously characterize the reactor contents from various reaction vessels 4. Conveying means 100 are conventional, such as 3.175 mm outside diameter polyfluorinated ethylene propylene flexible tubings supplied by Upchurch Scientific, Oak Harbor, Wash.

If desired, means 12 for independently controlling the reaction conditions in real time in each reaction vessel 4 may also include means 106 for maintaining pressure inside each reaction vessel 4 below a safe working pressure, such as, for example pressure safety valve with rupture disk and screw style holder supplied by McMaster-Carr Supply Company, New Brunswick, N.J. Means 106 are connected to one of the ports, such as fourth port 40 on stopper 16. Thus, if the reaction pressure inside reaction vessel 4 exceeds the safe working pressure, means 106 will automatically release the excess pressure to the atmosphere, thereby preventing any harm to the user or damage to either apparatus 1 or to the laboratory.

Means 14 of apparatus 1 for independently conveying one or more ingredients to and from each reaction vessel 4 allow the user to independently control and supply various reagents and/or solvents and also allow the user to withdraw reaction products from each of reaction vessel 4.

As shown in FIGS. 1, 2, 5 and 8, means 14 of apparatus 1 include a transfer manifold 108 connected to one or more reagents supply means 110A and one or more solvents supply means 110B and to a plurality of reagent conveying conduits 112 that connect transfer manifold 108 to the plurality of reaction vessels 4 for selectively conveying one or more reagents, solvents, or a mixture of reagents and solvents to each reaction vessel 4. Conduits 112, such as 3.175 mm outside diameter polyfluorinated ethylene propylene flexible tubings supplied by Upchurch Scientific, Oak Harbor, Wash., preferably pass through second port 38 of stopper 16 on each reaction vessel 4. Preferably, as shown in FIG. 8, the reagents from reagents supply means 110A and the solvents from solvents supply means 110B are connected to means 114 to propel one or more reagents and/or solvents from reagents supply means 110A to transfer manifold 108. Preferably, pneumatic pressure from a pressurized gas, such as nitrogen, argon or air, is supplied from means 114 to propel the reagents from reagents supply means 110A and solvents from solvents supply means 110B to reaction vessels 4. Nitrogen is preferred. Means 111 for regulating the pneumatic pressure, such as regulator valves supplied by Air Products and Chemicals, Inc. (Specialty Gas), Allentown, Pa., are preferably interposed between means 114 and reagents supply means 110A and solvents from solvents supply means 110B. It is contemplated that other conveying means, such as a conventional peristaltic pump, could also be used. Such a pump would be more suitable for conveying reagents that may be affected if exposed to air or gas. Alternatively, reagents supply means 110A and solvents supply means 110B may be positioned at an elevated location to utilize the force of gravity to supply reagents from supply means 110A and solvents from supply means 110B to reaction vessels 4. Another alternative that may be employed is to inject the solvents or reagents from a syringe connected to one of the ports on stopper 16, such as second port 38.

Figure 10:
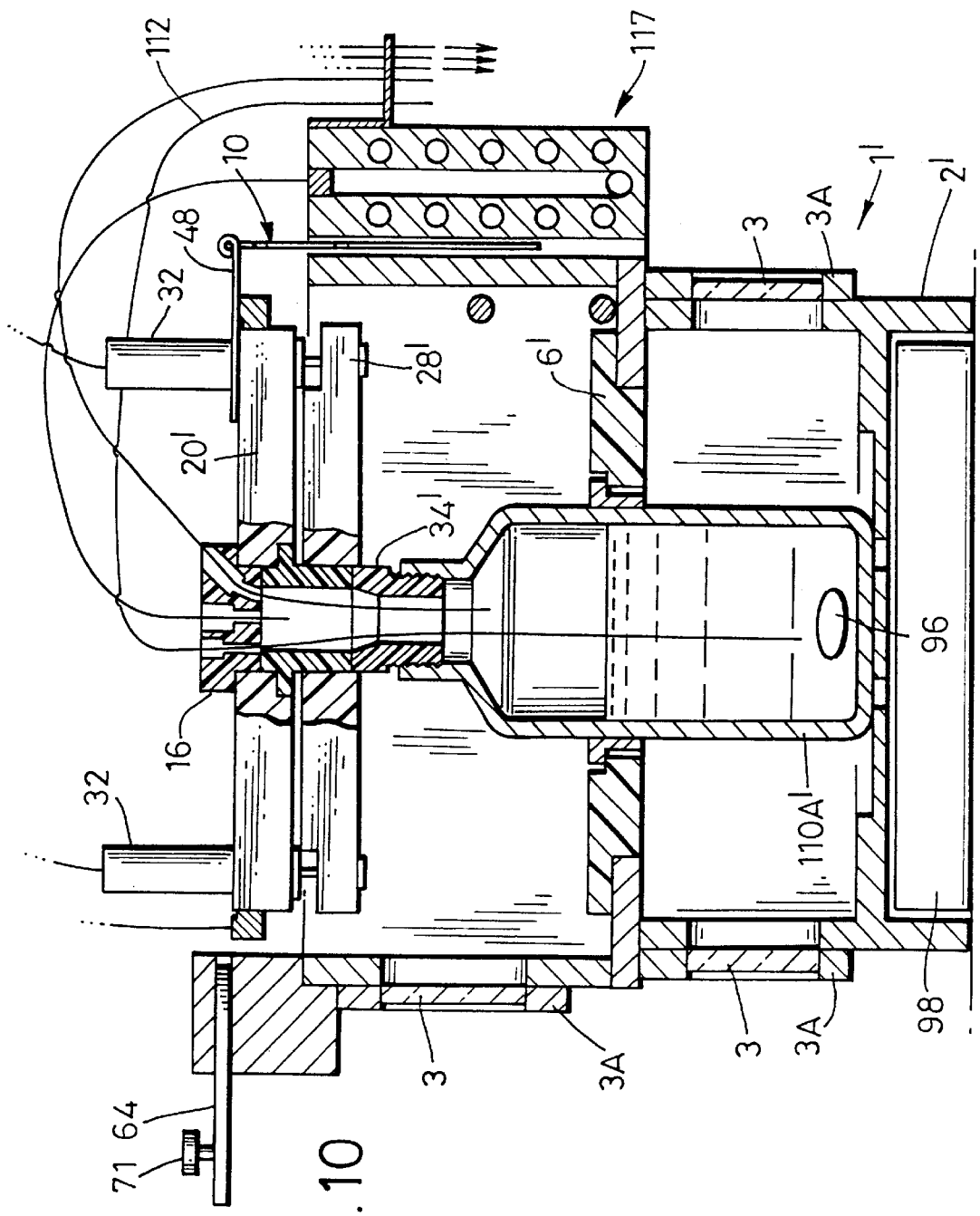
FIG. 10 is a partial cross sectional view taken along the section line AA of the partial three dimensional view of the apparatus in the direction BB.

Yet another alternative would to store and dispense solvents and reagents by substituting reaction vessels 4 in tank 2 with bottles containing reagents and/or solvents, which are then connected via stopper 16 to reaction vessels 4 positioned in tank 2 containing reactants. As shown in FIG. 10, stopper 16 is provided with standardized threads and size, and the overall dimensions of a tank 2' are adjusted to accommodate reagent and/or solvent bottles of standardized size, which are typically sold and supplied by the industry. The user may also convey solvents or reagents at desired temperatures to reaction vessels 4 by preheating or cooling them in modified tank 2' before being delivered to reaction vessels 4. Thus, the user could thereby not only automate the delivery of solvents and reagents to apparatus 1 without removing the solvents and reagents from the bottles in which they are supplied by the manufacturers but also minimize the possibilities of accidentally using incorrect solvents or reagents, since the user would be able to readily identify the solvents or reagents from the labels on the bottles supplied by the manufacturers.

Means 114 may be also utilized for supplying the pressurized gas to each reaction vessel 4, whereby conduits used for supplying the gas preferably pass through fourth port 42 of stopper 16 on each reaction vessel 4. The pressure and the supply of the pressurized gas to each reaction vessel 4 is regulated by conventional gas regulating means 116, which may be a manual or automatic needle valve. Regulator valves supplied by Air Products and Chemicals, Inc. (Specialty Gas), Allentown, Pa. are preferred. If desired, a sequencer or a manifold 115 may be used to selectively supply the gas to a desired reaction vessel 4. If necessary, another gas supply means (not shown) may be used to supply an inert gas to each reaction vessels 4. Some of the suitable inert gases include nitrogen, or noble gases, such as argon or helium. Nitrogen is preferred.

Means 14 of apparatus 1 further include means 117 for condensing volatile effluents from each reaction vessel 4, which are typically entrained in the pressurized gas stream. As seen in FIGS. 1, 2, 3 and 5, means 117 are preferably a coolant jacketed block 117A in which a plurality of preferably vertical drains 117C empty preferably into a slopping main drain 117B that empties into a waste discharge tank 126. Each reaction vessel 4 is preferably connected to one drain 117B. Block 117A is cooled by a coolant passing therethrough to condense effluents arising from each reaction vessel 4. Block 117A is made from a suitable heat conducting inert material capable of condensing effluents, such as aluminum, Hastelloy® stainless steel supplied by Haynes Industries, Kokoma, Ind., or suitable resinous materiel.

Means 14 of apparatus 1 further include regulating means 118 interposed between reagent supply means 110A and transfer manifold 108 all connected to conveying conduits 112 to selectively regulate supply of one or more reagents from transfer manifold 108 to the plurality of reaction vessels 4. Regulating means 118 are conventional and typically include a plurality of manual or automatic valves and sequencers to selectively supply reagents to those reaction vessels 4 that require the reagents. Such conventional regulating means 118 include multi-position stream selection valves (manual, or with a pneumatic or electric actuator, which may be programmed by a digital sequence programmer or a serial valve interface with RS-232 port connection to a computer) available from Valco Instruments Company of Houston, Tex. Means 14 of apparatus 1 further include regulating means 120 interposed between solvent supply means 110B and transfer manifold 108 via conveying conduits 112 to selectively supply solvents to those reaction vessels 4 that require the solvents. A switching valve 121 is preferably interposed between conveying conduit 112 entering reaction vessel 4 via port 36 on stopper 16 and regulating means 118 and regulating means 120, such that user may switch the flow of solvent or reagent, or both to vessel 4 at a desired rate and for a desired time. It is contemplated that the foregoing switching may be automated by means of conventional computer software program to automate the sequencing of the supply of reagents, solvents or a combination of reagents and solvents, to the plurality of reaction vessels 4.

Preferably, upon completion of reaction, the reactor contents from each reaction vessel 4 may be removed manually. However, if desired, the foregoing step may be automated by providing means 14 with means 124 for diverting the reactor contents. Means 124 are programmed or configured to either divert the reactor contents containing efflux to a waste discharge tank 126 connected to block 117A or divert the reactor contents to a product container 128 when the user or characterization device 102 determines that reactor contents contain a desired reaction product. Tlhe diverting action of means 124 may be manually conducted or programmed to occur after certain time, or if desired, it may be programmed to occur upon a signal from chemical characterization device that chemical reaction has been completed and a desired chemical compound has been formed. Conventional switching valves are suitable as means 124, such as for example, multi-position stream selection valves (manual, or with a pneumatic or electric actuator, which may be programmed by a digital sequence programmer or a serial valve interface with RS-232 port connection to a computer) available from Valco Instruments Company of Houston, Tex. Reaction vessels 4 are selectively pressurized by the pressurized gas from supply means 114 by selectively conveying the pressurized gas via valve 116 and sequencer 115. Alternatively, the reactor contents from reaction vessels 4 may be siphoned out via means 124 to container 128 or alternatively conveyed to waste discharge tank 126 by applying vacuum from a conventional vacuum pump with a trap to container 128 and waste discharge tank 126.

Under certain conditions, it may be desirable to remove liquid contents contained in one liquid phase separated from another immiscible liquid phase. Under such a condition, it may be desirable, as shown in FIG. 8, to remove liquid contents containing the desired reaction product at a liquid/liquid phase separation level 130 in reaction vessel 4. Reaction vessel 4, therefore, may include a plurality of means 132 for withdrawing reactor contents at phase separation level 130. An inlet end 134 of means 132 is positioned at separation level 130 in reaction vessel 4 for siphoning out liquid contents above separation level 130 in reaction vessel 4 or, if desired, inlet end 134 may be positioned towards the bottom of reaction vessel 4 to siphon off the liquid contents below separation level 130. Typically, means 132 include an elongated hollow lance, such as a glass tube passing through one of the ports of stopper 16 having inlet end 134 manually positioned at liquid/liquid phase separation level 130 in each reaction vessel 4. Conventional vacuum means or pneumatic means (not shown) may be employed to propel the liquid phase out of reaction vessel 4.

In its broadest aspect, apparatus 1 of the present invention is used to simultaneously synthesize multiple compounds. Generally, a desired amount of one or more reactants, biologically active components or organisms are charged to a plurality of reaction vessels 4. The reactant-charged vessels 4 are then mounted on reaction vessel mounting plate 6 positioned inside tank 2. A detailed plot of the positioning of each reaction vessel 4 inside tank 2 is recorded along with a detailed procedure of what reagents, solvents and reaction conditions are to be utilized at each reaction vessel 4 location. The foregoing information, if desired, could be stored on a conventional computer memory by means of conventional computer programs, such as Microsoft Word© or Excel© processing software supplied by Microsoft Corporation, Redmond, Wash. The plurality of lid blocks 8 are then lowered over reaction vessels 4 by lid block lifter means 10 to engage the adjacently located rows of reaction vessels 4. The foregoing engagement occurs in the following manner. First, lock bracket 60 of locking means 58 is swung away from first detent 62 on second arm 52 of lid block lifter means 10 to unlock lid blocks 8 held in a raised position. Then, second arm 52 slid down further into slot 54 and lid block lifter means 10 are swung down to place lid blocks 8 over reactant-charged vessels 4. Thereafter, lock bracket 60 is swung in to engage second detent 63 on second arm 52. The other end of lid block 8 is locked in by sliding in locker arm 64 in its chase by pushing on knob 71. Means 32 for reciprocating connector plate 28 are then activated to sealably engage vessel mount 34 on each reaction vessel 4. As a result, lid mount openings 30 on connector plate 28 slide over vessel mounts 34 of reaction vessel 4 sealably engage lid blocks 8 with reaction vessels 4.

As shown in FIGS. 1, 2, 3, 5 and 8, means 14 are used to convey one or more ingredients in real time to and from each of vessels 4. In order to minimize unwanted side reactions from taking place inside reaction vessels 4, it is preferable to sweep each reaction vessel 4 with an inert gas, preferably nitrogen, supplied from means 114 for removing most of the oxygen from the air present inside each reaction vessel 4.

Desired amounts of one or more reagents from reagents supply means 110A of means 14 are then conveyed to reaction vessels 4. The rate, amount and timing of reagents conveyed from reagents supply means 110A to reaction vessels 4 is selectively controlled by reagent regulating means 118 interposed between transfer manifold 108 connected to the plurality of reaction vessels 4 and reagents supply means 110A. If required, solvents from solvents supply means 110B may be also supplied via solvent regulating means 120.

Means 76 of means 68 are set by the user to maintain heat transfer medium 74 at the effective temperature. Based on the output from means 76, a signal is sent to means 72 to heat or cool heat transfer medium 74 to the effective temperature. Heat transfer medium 74 heated or cooled to the effective temperature is supplied though conveying means 78 for circulating heat transfer medium 74 to portion 80 of tank 2 below reaction vessel mounting plate 6. As a result, lower portions 82 of the plurality of reaction vessels 4 are heated or cooled to the effective temperature. The heating or cooling output of means 72 for heat transfer medium 74 is adjusted on the basis of the reaction temperature feed back sent by sensing means 66 from each reaction vessel 4.

When lower portions 82 of the plurality of reaction vessels 4 are heated, upper portions 94 of the plurality of reaction vessels 4 are preferably cooled to an effective cooling temperature to allow refluxing of any volatile contents that may be created during the reaction by circulating cooling medium 88 in portion 84 of tank 2 above reaction vessel mounting plate 6. Means 90 are used to control the reflux temperature of the contents in reaction vessels 4 by maintaining cooling medium 88 at the effective cooling temperature set by the user. Cooling means 92 supply cooling medium 88 at the effective cooling temperature to portion 84 of tank 2.

During the reaction, the reactor contents in each reaction vessel 4 are independently and individually agitated by means 70 for agitating the reactor contents in each reaction vessel 4. The rate of agitation inside each reaction vessel 4 is independently controlled for desired durations by means 98 to selectively propel agitator 96 placed inside each reaction vessel 4. The rates of rotation of agitator 96 in each reaction vessel 4 depend upon the reaction kinetics, the size of reaction vessel 4, the amount of reactor contents present in reaction vessel 4, the type of reactants being utilized and the viscosity of the reactor contents. If desired, the user may program means 98 to progressively or in discrete steps reduce the rates of rotation as the reaction progresses. Generally, agitator 96 is rotated at RPMs in the range of from 100 to 700, preferably RPMs in the range of from 150 to 300.

At the completion of synthesis in reaction vessels 4, supply of various reagents is shut off; the reaction temperature, if required, is brought down to room temperature; heat transfer medium 74, if required, is drained off from portion 80 of tank 2; and if required, solvents may be supplied to reaction vessels 4 to remove the reaction products as a solution, which may then be precipitated out or dried to provide the desired reaction products.

The disengaging process of lid mounts 8 from reaction vessels 4 typically occurs in the following manner. Means 32 for reciprocating connector plate 28 are activated to disengage connector plate 28 from reaction vessels 4, knob 71 is pushed to slide out locker arms 64 and lock bracket 60 is swung out to disengage second detent 63 on second arm 52. Lid block lifter means 10 are then swung away in an upwardly direction, lock bracket 60 of locking means 58 is then swung in to lock on first detent 62 on second arm 52 of lid block lifter means 10, thereby holding lid blocks 8 in a raised position. Exposed reaction vessels 4 are then removed from reaction vessel mounting plate 6 positioned inside tank 2 and after preferably separating vessel mounts 34 from reaction vessels 4, the reaction products are manually removed. The reaction conditions and information related to the reaction products are recorded on a plot or stored as a computer record for the identifying the reaction products and their location on the plot.

If desired, the reaction products may be characterized in real time by conveying an aliquot of the reactor contents from each reaction vessel 4 to conventional chemical characterization device 102. Thus, the user can adjust the reaction temperature, the reactor content, agitation and the type and amount of reagents, solvents, or both being supplied to each reaction vessel 4 once or as the reaction products being produced in each reaction vessel 4, are characterized by characterization device 102. Means 104 for conveying an aliquot of the reactor contents may be used to sequentially convey the aliquot to characterization device 102 from reaction vessels 4.

Apparatus 1 of the present invention is well suited for conducting a variety of reaction products and it can readily produce a library of reaction products by charging each reaction vessel 4 with one or more of the same or a different reactant. By reacting these reactants with one or more reagents, one is able to then readily, quickly and efficiently produce a very large library of reaction products.

If desired, apparatus 1 may be coupled to a programmable computer for automating the preparation of a library of reaction products by utilizing the apparatus 1.

Figure 11:
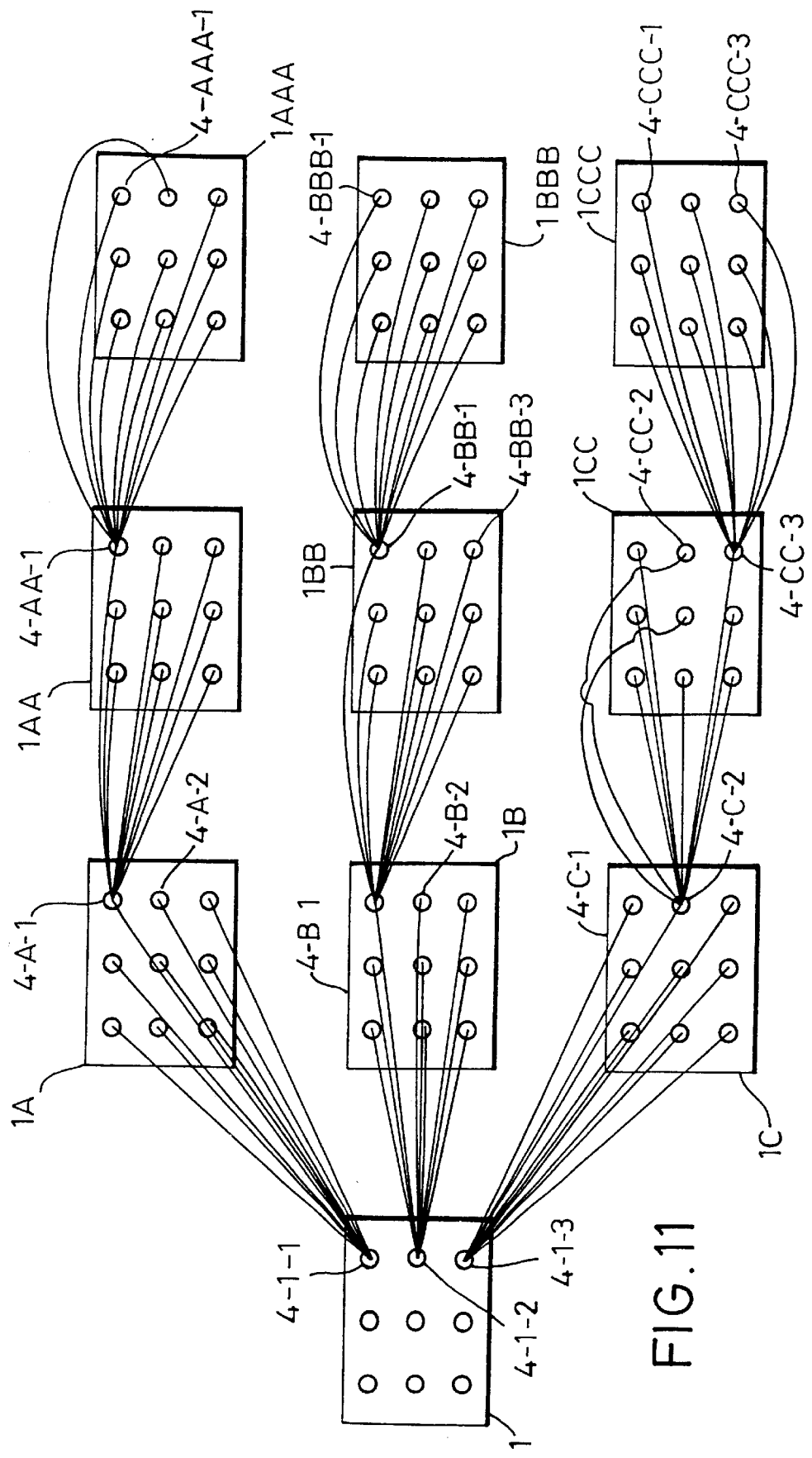
FIG. 11 is a schematic diagram of one embodiment of the plurality of the apparatus of the present invention interconnected to simultaneously synthesize a very large library of compounds.
Figure 12:
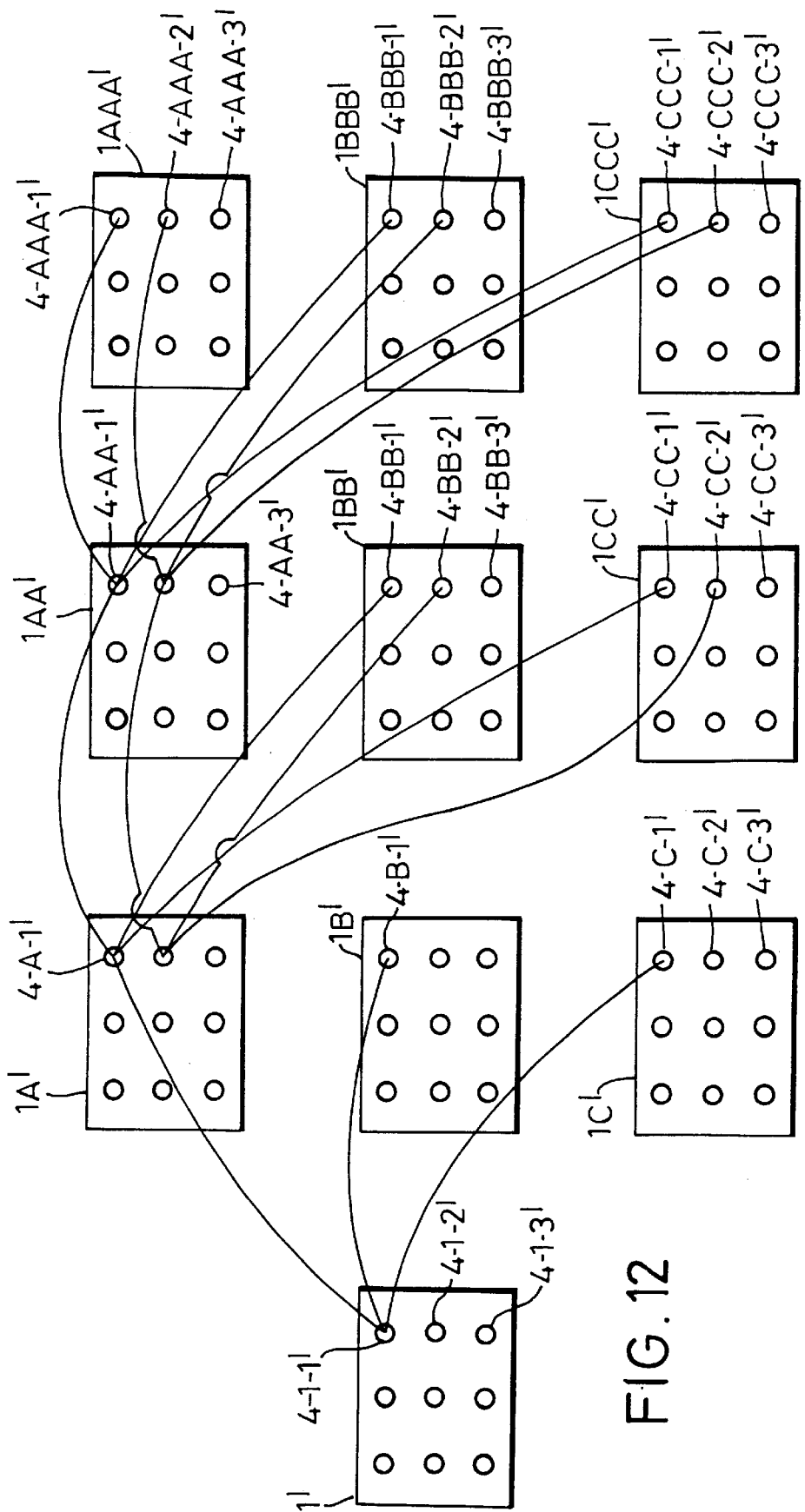
FIG. 12 is a schematic diagram of another embodiment of the plurality of the apparatus of the present invention interconnected to simultaneously synthesize a very large library of compounds.

If desired, as shown in FIGS. 11 and 12, a plurality of apparatus 1 may be interconnected to create a much wider and complex library of compounds.

FIG. 11 shows a reaction product outlet of vessel 4-1-1 of apparatus 1 connected to an inlet of a reaction vessel 4-A-1 of an apparatus 1A, an outlet of reaction vessel 4-A-1 of apparatus 1A connected to an inlet of a reaction vessel 4-AA-1 of an apparatus 1AA and finally an outlet of a reaction vessel 4-AA-1 of apparatus 1AA is connected to an inlet of a reaction vessel 4-AAA-1 of an apparatus 1AAA. Other reaction vessels of apparatus 1 are similarly connected apparatus 1B, 1C, 1BB, 1CC, 1BBB and 1CCC.

Several alternative combinations are also contemplated, such as for example, the interconnections shown in FIG. 12, whereby a reaction product outlet of vessel 4-1-1' of an apparatus 1' is connected to inlets of reaction vessels 4-A-1' of an apparatus 1A', 4-B-1' of an apparatus 1B' and 4-C-1' of an apparatus 1C'. An outlet of reaction vessel 4-A-1' of apparatus 1A' is connected to inlets of reaction vessels 4-AA-1' of an apparatus 1AA', 4-BB-1' of an apparatus 1BB' and 4-CC-1' of an apparatus 1CC'. Finally an outlet of reaction vessel 4-AA-1' of apparatus 1AA' is connected to inlets of reaction vessels 4-AAA-1' of an apparatus 1AAA', 4-BBB-1' of an apparatus 1BBB' and 4-CCC-1' of an apparatus 1CCC'. Other reaction vessels of apparatus 1A' are similarly connected apparatus 1BB', 1CC', 1BBB' and 1CCC'. Thus, a vast library of compounds could be simultaneously synthesized by utilizing multiple apparatus of the present invention interconnected in a fashion described above and installed in a compact laboratory space.

Apparatus 1 may be also used in parallel, solid phase synthesis technology that utilizes sequential coupling reactions for preparing compounds such as, oligonucleotides and peptides. The following procedures illustrate some of the ways in which the foregoing compounds may be synthesized:

Reaction vessels 4 are charged with a conventional functionalized polymer substrate, which is an insoluble material containing an accessible reactive moiety such as, for example, a carboxyl, hydroxyl, amino or halomethyl moiety. The accessible reactive moiety is used to covalently attach an incoming building block. Some of the suitable polymer substrates include those made from cross-linked divinylbenzene-styrene polymer (polystyrene), controlled pore glass, polyacrylamides, poly(ethylene glycol), silica gel, cellulose and acrylic acid grafted polypropylene. Substrate 4C as shown in FIG. 9C, in the form polystyrene beads is preferred. After charging reaction vessels 4 with appropriate substrate 4C, screen 4B is fitted thereon to prevent loss of substrate 4C during the reaction and reaction vessels 4 are positioned on reaction vessel mounting plate 6.

The generalized steps necessary to perform a synthesis are known in the art and these include:

1) development of a feasible synthetic route on a solid substrate being utilized,
2) verification of the resin-based synthesis using several representative examples, and
3) execution of multiple, simultaneous synthesis within an array format.

The method involves sequential coupling of building blocks to form substrate-bound intermediates until the final or penultimate compound at each reaction vessel 4 location in the array, is constructed. At this stage, building blocks are still bound to substrate 4C. In addition to coupling the building blocks directly, one may add, if required, a coupling agent or reagent which is intended to chemically participate in forming the covalent bond between substrate 4C and the building block or between the building blocks. Coupling reagents include catalysts and chemical reagents. The sequential coupling reactions may be performed using one of the following approaches:

Approach I. Charging reaction vessel 4 with substrate 4C with attached building block wherein the building block has a reactive moiety protected by a protecting group and a solvent;

removing the protecting group from the reactive moiety with a deprotection reagent;

removing the deprotection reagent;

sequentially adding additional reactive building blocks in solvents to synthesize the compounds; and cleaving the compounds from substrate 4C within reaction vessel 4 to produce the desired compounds.

Approach II. Charging reaction vessel 4 with substrate 4C with attached building block wherein the building block has one or more reactive moieties protected by one or more protecting groups and a solvent;

removing the protecting group from the reactive moiety with a deprotection reagent;

removing the deprotection reagent;

adding a coupling reagent in a solvent;

sequentially adding additional reactive building blocks having reactive and protected functionalities, and optionally coupling reagents in solvents to synthesize the compounds; and cleaving the compounds from substrate 4C within reaction vessel 4 to produce the desired compounds.

Approach III. Charging reaction vessel 4 with substrate 4C with attached building block and a solvent;

adding a reagent for changing the oxidation state of the reactive moiety;

sequentially adding additional reactive building blocks in solvents to synthesize the compounds; and cleaving the compounds from substrate 4C within reaction vessel 4 to produce the desired compounds.

Approach IV. Charging reaction vessel 4 with substrate 4C with attached building block and a solvent;

adding a reagent for changing the oxidation state of the reactive moiety;

adding a coupling reagent in a solvent;

sequentially adding additional reactive building blocks and optionally coupling reagents in solvents to synthesize the compounds; and cleaving the compounds from substrate 4C within reaction vessel 4 to produce the desired compounds.

Other strategies for constructing the growing compounds substrate 4C are also possible and are encompassed within the scope of the present invention.

The advantage and the flexibility of use of the apparatus of the present invention is that it permits the user to utilize reaction conditions that closely match or mimic actual production conditions. As a result, the apparatus and the method of the present invention can be efficiently utilized in scale-up of general organic or inorganic compounds.

Apparatus 1 of the present invention is well suited for use in biologically hostile or dangerous environments, such as those encountered in handling radioactive, poisonous, or biologically active components or dangerous substances. It is contemplated that apparatus 1 could be placed in a hermetically sealed chamber with ready access to apparatus 1 through conventional hermetically sealed flexible gloves attached to the walls of the chamber, whereby the user inserts his or her hands and arms inside these gloves for reaching and manipulating the components of apparatus 1. Some of the suitable biologically active components include bacteria, fungi, and viruses.

Apparatus 1 of the present invention is also well suited for use in process scale-up, chemical purification, such as crystallization, sublimation and distillation, other chemical reactions, such as fermentation, cell culturing, viral and gene research, biomass production, and processing of food and beverages.

EXAMPLES

The following non-limiting examples are presented to illustrate the invention. However, they are not intended to limit the invention in any manner.

Table 1 below, shows the location plot of various compounds produced:

TABLE 1

| 11 | 12 | 13 | 14 | 15 |
|----|----|----|----|----|
| 6  | 7  | 8  | 9  | 10 |
| 1  | 2  | 3  | 4  | 5  |

The Fischer esterification process, as shown below, was utilized in producing compounds at various plot locations, shown in Table 2 below:

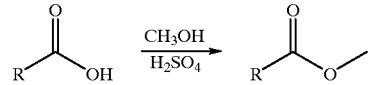

One gram each of 15 different carboxylic acids was placed in each reaction vessel 4 and 30 mL of $CH_3OH$ was added to each vessel 4. 4 mL of 5% $H_2SO_4$ in $CH_3OH$ was then added to each vessel 4 by syringe. The reactor contents were stirred magnetically at 300 RPM by means of agitator 96 and portions 82 of reactor vessels 4 were heated to the effective temperature of 65° C. for a total of 16 hours.

Additional methanol was added to reactor vessels 4 at plot locations 1, 11 and 14 in an attempt to dissolve the carboxylic acid. The solutions were concentrated to a volume of less than 5 mL by heating at the effective temperature of 65° C. while sequentially passing a stream of nitrogen into each vessel 4. Effluent condensate was collected in coolant jacketed block 117A and then discharged in waste tank 126. To each reaction vessel 4, 20 mL of crushed ice was added, followed by 5 ml of 20% $K_2CO_3$, or until reactor contents turned basic. Reaction products at plot locations 1, 3, 7, 11, and 12 yielded solids, which were collected on a Buchner funnel, washed with water, and air-dried. To each of the remaining vessels 4, 20 ml THF and 30–50 ml ethyl ether were added. The mixtures were stirred magnetically for 15 minutes at 300 RPM.

At this point, the remaining vessels 4 and lid mounts 8 were raised from tank 2 to permit access to reaction vessels 4. The contents of each reaction vessel 4 were transferred sequentially to a separatory funnel. The aqueous phases were removed, the organic phases were washed with water and dried over $Na_2SO_4$. Solvent was removed in vacuo and the reaction products were analyzed by 300 MHz $^1$H NMR and thin-layer chromatography. The reaction product at location 4 in the plot crystallized, which was air-dried.

TABLE 2

| A | Starting Reagent 1.0 gram (Carboxylic Acid) | Final Product (Ester) | B | C °C. | D | E |
|---|---|---|---|---|---|---|
| 1 | 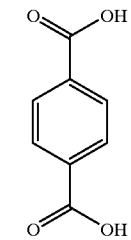<br>terephthalic acid<br>MW = 166.132<br>mmoles = 6.02 | 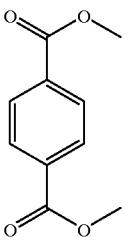<br>dimethyl terephthalate<br>MW = 194.19<br>Theoretical yield in grams = 1.17 | 96.7 | 138–141 | 0.53<br>(1:1 hexane/ether) | white solid |
| 2 | 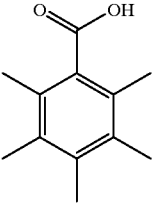<br>pentamethylbenzoic acid<br>MW = 192.258<br>mmoles = 5.20 | 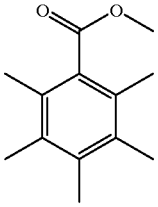<br>dimethyl pentamethyl benzoate<br>MW = 206.29<br>Theoretical yield in grams = 1.07 | 2.8 | | not visible<br>(1:1 hexane/ether) | colorless oil |
| 3 | 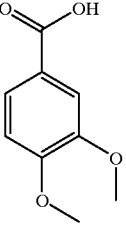<br>3,4-dimethoxy benzoic acid<br>MW = 182.175<br>mmoles = 5.49 | 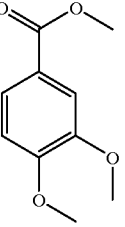<br>methyl 3,4-dimethoxybenzoate<br>MW = 196.20<br>Theoretical yield in grams = 1.08 | 80.3 | 59–60 | 0.32<br>(1:1 hexane/ether) | white solid |
| 4 | 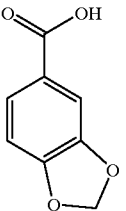<br>piperonylic acid<br>MW = 166.165<br>mmoles = 6.02 | 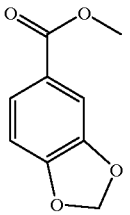<br>methyl piperonylate<br>MW = 180.16<br>Theoretical yield in grams = 1.08 | 89.1 | 52–54 | 0.72<br>(ether) | white solid |

TABLE 2-continued

| A | Starting Reagent 1.0 gram (Carboxylic Acid) | Final Product (Ester) | B | °C. | D | E |
|---|---|---|---|---|---|---|
| 5 | 3-amino-2-methylbenoic acid<br>MW = 151.165<br>mmoles = 6.62 | methyl 3-amino-2-methylbenzoate<br>MW = 165.19<br>Theoretical yield in grams = 1.09 | 0.0 | ******** | ******* | |
| 6 | 1-naphthoic acid<br>MW = 172.183<br>mmoles = 5.81 | methyl 1-naphthoate<br>MW = 186.21<br>Theoretical yield in grams = 1.08 | 95.2 | | 0.72<br>(ether) | brown oil |
| 7 | 1-(p-toluyl)-1-cyclopentane carboxylic acid<br>MW = 218.296<br>mmoles = 4.58 | methyl 1-(p-toluyl)-1-cyclopentane carboxylate<br>MW = 232.32<br>Theoretical yield in grams = 1.06 | 93.2 | 60–62 | 0.62<br>(1:1 hexane/ether) | off-white solid |
| 8 | 3,4-hexadienoic acid<br>MW = 112.128<br>mmoles = 8.92 | methyl 3,4-hexadienoate<br>MW = 126.15<br>Theoretical yield in grams = 1.13 | 62.0 | | 0.72<br>(ether) | yellow oil |

TABLE 2-continued

| A | Starting Reagent 1.0 gram (Carboxylic Acid) | Final Product (Ester) | B | C °C. | D | E |
|---|---|---|---|---|---|---|
| 9 | 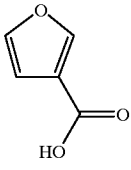<br>3-furoic acid<br>MW = 112.084<br>mmoles = 8.92 | 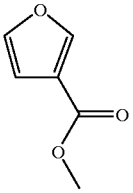<br>methyl 3-furoate<br>MW = 126.11<br>Theoretical yield in grams = 1.13 | 17.2 | | 0.72<br>(ether) | yellow oil |
| 10 | 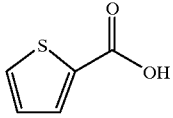<br>2-thiophene carboxylic acid<br>MW = 128.149<br>mmoles = 7.80 | 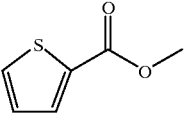<br>methyl 2-thiophene carboxylate<br>MW = 142.18<br>Theoretical yield in grams = 1.11 | 81.8 | | 0.60<br>(1:1 hexane/ether) | yellow oil |
| 11 | 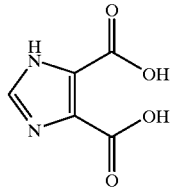<br>4,5-imidazole dicarboxylic acid<br>MW = 156.097<br>mmoles = 6.41 | 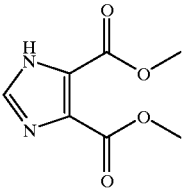<br>dimethyl 4,5-imidazole dicarboxylate<br>MW = 184.15<br>Theoretical yield in grams = 1.18 | *** | | ***** | |
| 12 | 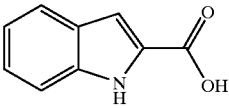<br>indole-2-carboxylic acid<br>MW = 161.16<br>mmoles = 6.21 | 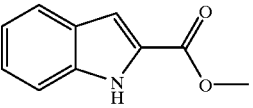<br>methyl indole-2-carboxylate<br>MW = 175.19<br>Theoretical yield in grams = 1.09 | 88.4 | 52–54 | 0.40<br>(1:1 hexane/ether) | off-white solid |
| 13 | 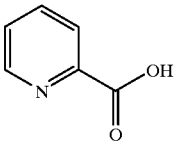<br>picolinic acid<br>MW = 123.111<br>mmoles = 8.12 | 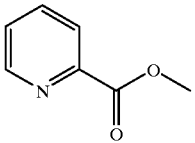<br>methyl picolinate<br>MW = 137.14<br>Theoretical yield in grams = 1.11 | 18.9 | | 0.10<br>(1:1 hexane/ether) | colorless oil |

TABLE 2-continued

| A | Starting Reagent 1.0 gram (Carboxylic Acid) | Final Product (Ester) | B | C °C. | D | E |
|---|---|---|---|---|---|---|
| 14 | 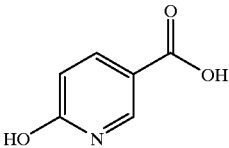<br>6-hydroxynicotinic acid<br>MW = 139.11<br>mmoles = 7.19 | 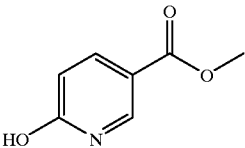<br>methyl 6-hydroxynicotinate<br>No conversion | 10.9 | | 0.01<br>(1:1 hexane/ether) | white solid |
| 15 | 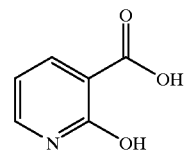<br>2-hydroxynicotinic acid<br>MW = 139.11<br>mmoles = 7.19 | 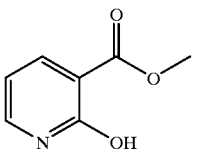<br>methyl 2-hydroxynicotinate<br>MW = 153.14<br>Theoretical yield in grams = 1.10 | 0.0 | | ****** | ****** |

A = Position in the plot of Table 1
B = % Product Yield
C = Melting Point
D = elution distance relative to eluent (Thin layer Chromatography eluent)
E = Appearance From the forgoing Examples, it is seen that the apparatus 1 and the method of the present invention is well suited for simultaneously synthesizing general compounds.

What is claimed is:

1. An apparatus for multiple, simultaneous synthesis of compounds comprising:

a tank having located therein a plurality of reaction vessels supported by a reaction vessel mounting plate positioned inside said tank;

a plurality of lid blocks detachably mounted atop said tank whereby each said lid block selectively engages or disengages an adjacently located row of said reaction vessels; and wherein each said lid block comprises;

a plurality of stoppers positioned on an uppor face of a stopper plate and a plurality of lid mounts positioned on a bottom face of said stopper plate, each said lid mount being in a sealable contact with each said stopper adjacent thereto and each said stopper being provided with a plurality of ports, a connector plate slidably mounted on and aligned with said stopper plate, said connector plate having a plurality of lid mount openings therein to allow said lid mounts to pass therethrough, and means for reciprocating said connector plate for sealably engaging or disengaging with a vessel mount positioned in corresponding relationship with each said lid mount on said stopper plate, each said vessel mount being demountably mounted to each said reaction vessel; and a lid block lifter means for lowering or raising each said lid block to respectively sealably engage or disengage from said adjacently located row of said reaction vessels, such that said adjacently located row of said reaction vessels is exposed when said lid block lifter means are disengaged from said adjacently located row of said reaction vessels.

2. The apparatus of claim 1 further comprising means for independently controlling the reaction conditions in real time in each said reaction vessels.

3. The apparatus of claim 2 wherein said means for independently controlling reaction conditions in real time in each said reaction vessel comprise:

means for sensing reaction temperature in each said reaction vessel, means for controlling the reaction temperature of the contents in said plurality of said reaction vessels; and means for agitating the reactor contents in each of said reaction vessels.

4. The apparatus of claim 3 wherein said means for controlling the reaction temperature of the contents in said plurality of said reaction vessels comprise:

means for heating or cooling a heat transfer medium to an effective temperature, means for maintaining said heat transfer medium at said effective temperature; and means for supplying said heat transfer medium at said effective temperature to a portion of said tank below said reaction vessel mounting plate for heating or cooling lower portions of said plurality of said reaction vessels.

5. The apparatus of claim 3 wherein said means for controlling the reaction temperature of the contents in said plurality of said reaction vessels comprise:

means for heating a heating medium to an effective temperature, means for maintaining said heating medium at said heating effective temperature;

means for supplying said heating medium at said effective temperature to a portion of said tank below said reaction vessel mounting plate for heating lower portions of said plurality of said reaction vessels;

means for cooling a cooling medium to an effective cooling temperature, means for maintaining said cooling medium at said effective cooling temperature; and means for supplying said cooling medium at said effective cooling temperature to a portion of said tank above said reaction vessel mounting plate for cooling upper portions of said plurality of said reaction vessels.

6. The apparatus of claim 3 wherein said means for agitating the reactor contents comprise:

an agitator positioned in each said reaction vessel; and a means for selectively propelling said agitator positioned in each said reaction vessel to control the rate of agitation in each said reaction vessel.

7. The apparatus of claim 6 wherein said means for selectively propelling said agitator positioned in each of said reaction vessels are located underneath said tank.

8. The apparatus of claim 3 wherein said means for independently controlling reaction conditions in real time in each said reaction vessel further comprise:

means for conveying an aliquot of the reactor contents from each said reaction vessel to a chemical characterization device, and means for maintaining pressure inside each said reaction vessel below a safe working pressure.

9. The apparatus of claim 1 further comprising means for independently conveying one or more ingredients in real time to and from each of said reaction vessels.

10. The apparatus of claim 9 wherein said means for conveying one or more ingredients to and from each said reaction vessel comprise:

a transfer manifold connected to one or more reagents supply means and to a plurality of reagent conveying conduits that connect said transfer manifold to said plurality of said reaction vessels for selectively conveying said one or more said reagents to each said reaction vessel, means for supplying an inert gas to each said reaction vessel, and means for condensing volatile effluents each said reaction vessel entrained in said inert gas.

11. The apparatus of claim 10 wherein said means for conveying said one or more ingredients to each said reaction vessel further comprise regulating means interposed between said transfer manifold and each of said reagent conveying conduits to selectively regulate supply of said one or more reagents from said transfer manifold connected to said plurality of said reaction vessels.

12. The apparatus of claim 11 further comprising means for withdrawing reactor contents from each said reaction vessel, said means comprising:

means for diverting said reactor contents to a discharge tank when said reactor contents contain efflux and for diverting said reactor contents to a product container when said reactor contents contain a reaction product.

13. The apparatus of claim 12 wherein said means for withdrawing reactor contents from each said reaction vessel further comprise means for positioning an inlet end of said means for withdrawing reactor contents at a liquid/liquid phase separation level in each said reaction vessel.

14. The apparatus of claim 1 wherein a head of said stopper is provided with a first port, a second port, a third port, a fourth port, fifth port and a sixth port.

15. The apparatus of claim 1 wherein each said lid block lifter means comprise a first arm connected to an arm end of each said stopper plate of each said lid block and a second arm slidably engaged with a slot on said tank, each said lid block lifter means further comprising swivel means positioned between said first and second arms to selectively raise or lower each said lid block;

locking means comprising a first detent positioned on said second arm of said lid block lifter means for engaging a lock bracket affixed to said tank to secure said lid block in a raised open position to allow access to said reaction vessels positioned below said lid block, and a second detent positioned on said second arm for engaging said lock bracket to secure said lead block in a lowered position; and a locker arm positioned on said tank to lock-in said lid block when said lid block is sealably engaged with said adjacent row of said reaction vessels.

16. The apparatus of claim 1 wherein one or more of said reaction vessel further comprises a screen positioned therein to prevent loss of solid support placed in said reaction vessel.

17. The apparatus of claim 1 further comprising a plurality of said reaction vessel mounting plates.

* * * * *